US012426546B2

(12) United States Patent
Bowden, Jr.

(10) Patent No.: US 12,426,546 B2
(45) Date of Patent: Sep. 30, 2025

(54) BALE HANDLER FOR SMALL RECTANGULAR BALES

(71) Applicant: Donald F. Bowden, Jr., Canandaigua, NY (US)

(72) Inventor: Donald F. Bowden, Jr., Canandaigua, NY (US)

( * ) Notice: Subject to any disclaimer, the term of this patent is extended or adjusted under 35 U.S.C. 154(b) by 0 days.

(21) Appl. No.: 18/633,333

(22) Filed: Apr. 11, 2024

(65) Prior Publication Data
US 2024/0349649 A1  Oct. 24, 2024

Related U.S. Application Data

(60) Provisional application No. 63/460,823, filed on Apr. 20, 2023.

(51) Int. Cl.
*A01D 85/00* (2006.01)
*A01D 87/12* (2006.01)

(52) U.S. Cl.
CPC ......... *A01D 85/005* (2013.01); *A01D 87/125* (2013.01); *A01D 2085/007* (2013.01)

(58) Field of Classification Search
CPC ...... A01D 85/005; A01D 85/00; A01D 87/12; A01D 87/122
See application file for complete search history.

(56) References Cited

U.S. PATENT DOCUMENTS

| | | | | |
|---|---|---|---|---|
| 3,159,287 A | * | 12/1964 | Stroup | A01D 87/12 56/473.5 |
| 3,430,783 A | | 3/1969 | Butler | |
| 3,549,023 A | | 12/1970 | Backman | |
| 4,793,124 A | * | 12/1988 | Anderson | A01F 15/071 53/556 |
| 4,971,504 A | | 11/1990 | Klompien | |
| 5,003,754 A | * | 4/1991 | Stirling | A01F 25/14 188/4 R |
| 5,152,125 A | * | 10/1992 | Laver | A01F 15/071 53/210 |
| 5,501,562 A | * | 3/1996 | Zimmerman | A01D 85/005 D15/27 |
| 5,660,023 A | * | 8/1997 | Kivela | B65B 11/025 53/399 |
| 6,070,400 A | * | 6/2000 | Peeters | A01F 15/071 53/588 |
| 6,364,591 B1 | * | 4/2002 | Stevenson | A01D 90/08 414/789.7 |

(Continued)

*Primary Examiner* — Gloria R Weeks
(74) *Attorney, Agent, or Firm* — Miller Law Group, PLLC

(57) ABSTRACT

A bale handling apparatus is operable to receive bales from a square baler and create cubic stacks of bales for discharge from the bale handling apparatus. The bale handing apparatus includes an elevator provided with a lateral shuttle mechanism that creates rows of three laterally aligned bales, and a stacking mechanism that receives accumulated rows of bales from the elevator to create a vertical module of bales. The stacking mechanism includes a pusher plate that pushes the bale modules toward a wrapping apparatus that wraps an accumulated cubic stack of bales with wrapping material to establish integrity to the cubic stack. The cubic stacks are retained on a discharge floor extending rearwardly from the wrapping mechanism until a predetermined number of cubic stacks can be discharged at a desired location for subsequent pick-up and storage.

20 Claims, 18 Drawing Sheets

(56) References Cited

U.S. PATENT DOCUMENTS

| | | | | |
|---|---|---|---|---|
| 7,080,494 B2* | 7/2006 | Toews | .................... | A01F 15/005 |
| | | | | 53/529 |
| 7,322,173 B2* | 1/2008 | Desnoyers | .............. | B65B 27/12 |
| | | | | 53/587 |
| 7,610,851 B1* | 11/2009 | Horst | .................... | A01D 85/005 |
| | | | | 53/529 |
| 8,122,822 B1* | 2/2012 | Horst | .................... | A01D 85/002 |
| | | | | 100/188 R |
| 8,365,898 B2* | 2/2013 | Horst | .................... | B65G 65/02 |
| | | | | 198/512 |
| 10,178,831 B2* | 1/2019 | Kelderman | .......... | A01D 85/005 |
| 2012/0260609 A1* | 10/2012 | Kivela | .................. | B65B 63/026 |
| | | | | 53/461 |
| 2024/0349649 A1* | 10/2024 | Bowden, Jr. | ......... | A01D 87/125 |

* cited by examiner

Fig. 9
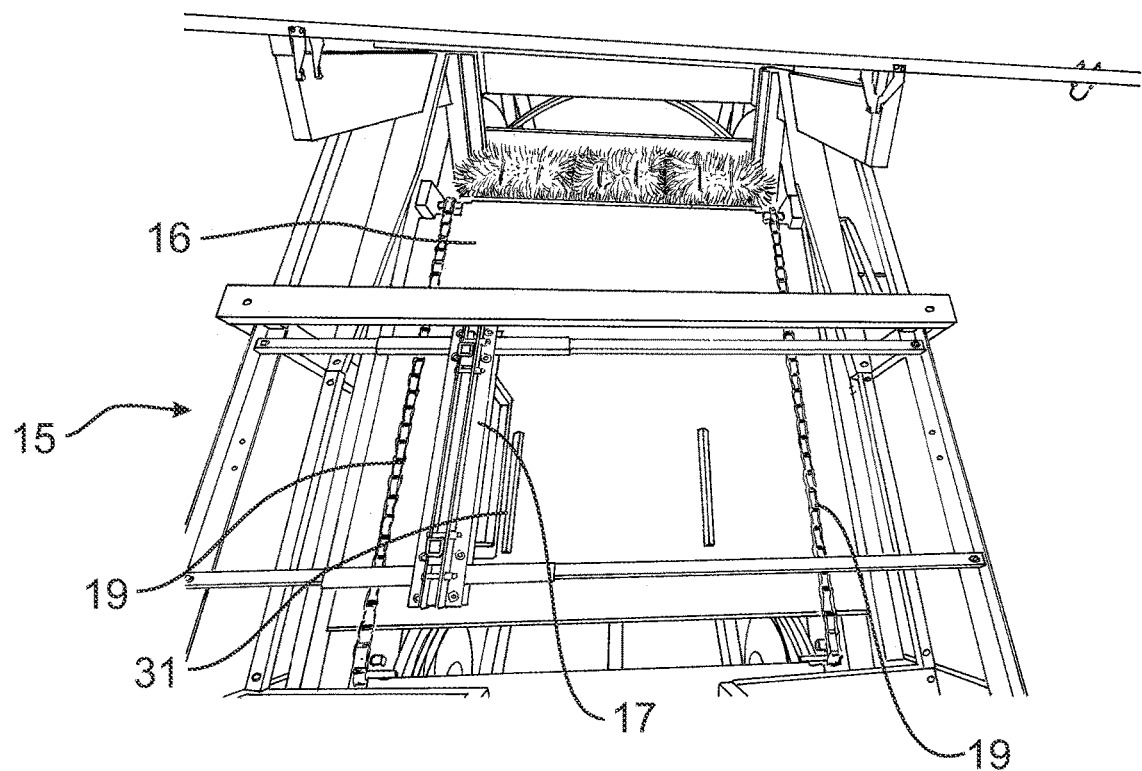
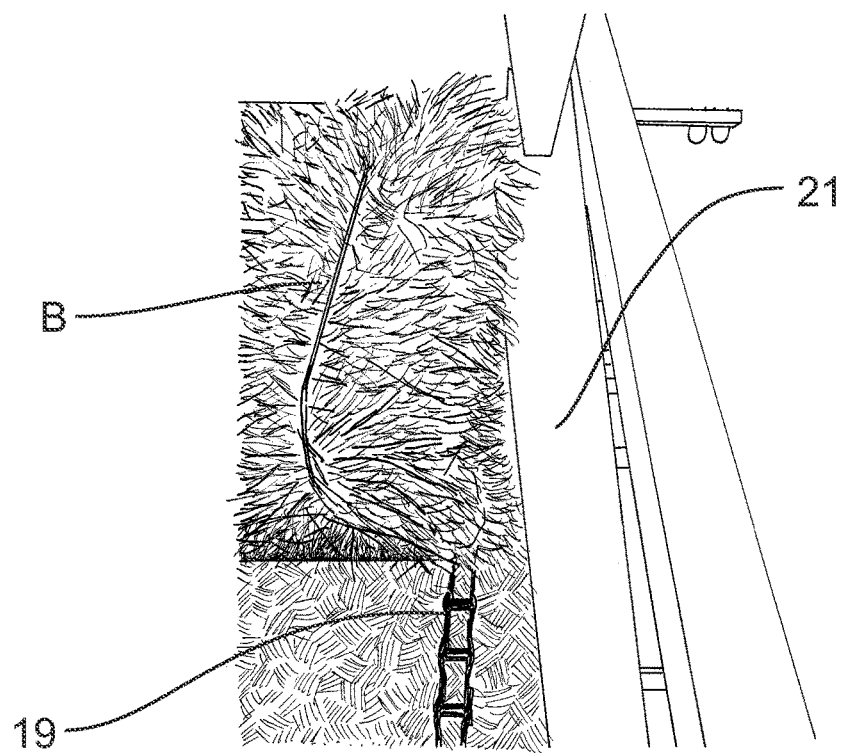
Fig. 8

Fig. 16
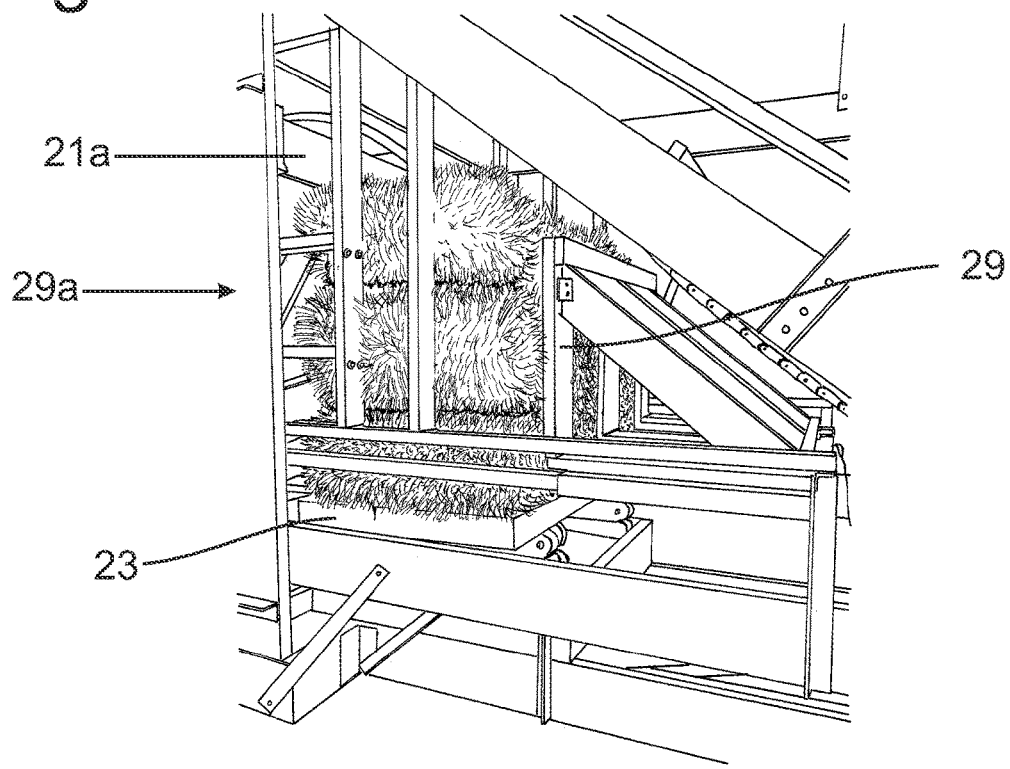
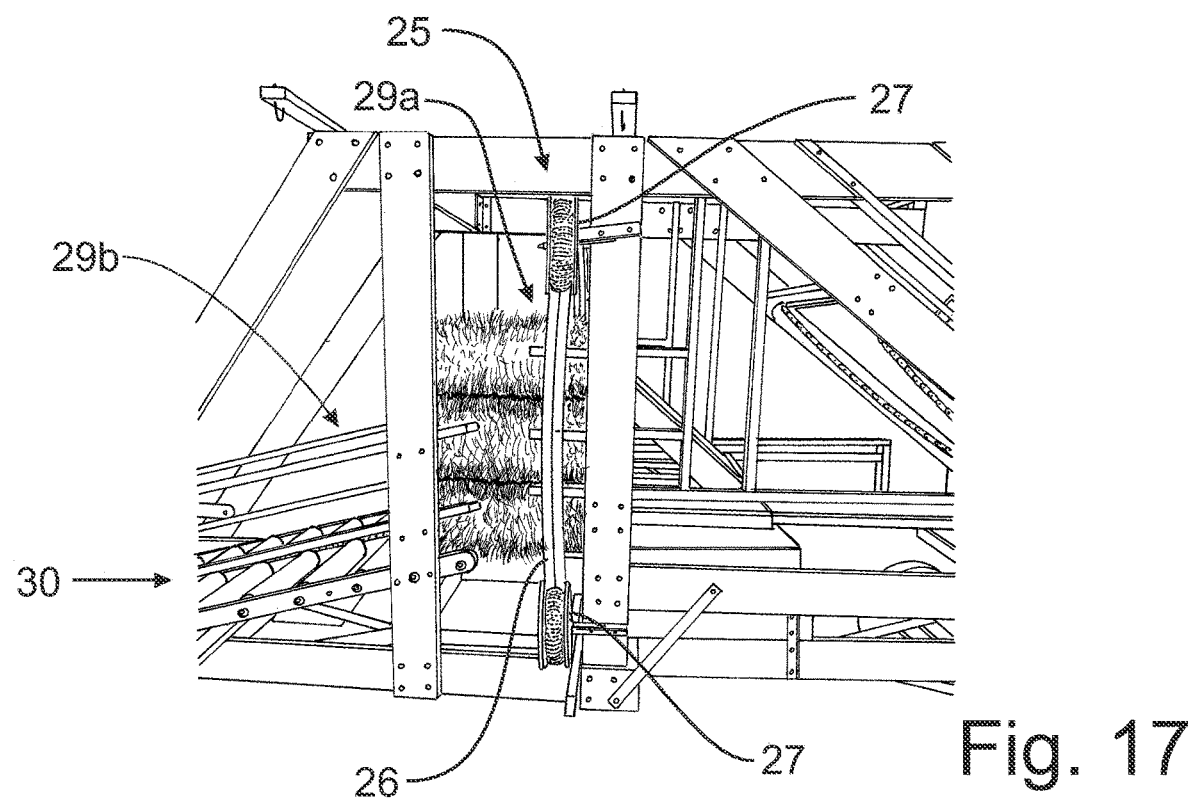
Fig. 17

Fig. 24
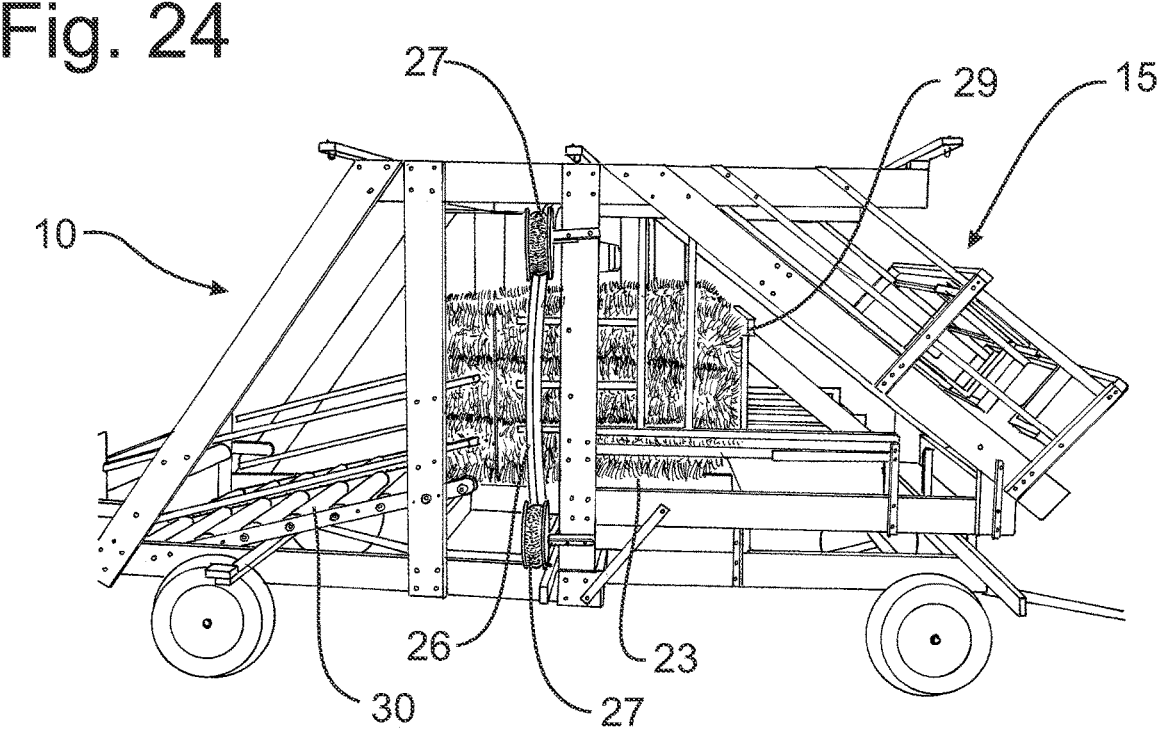
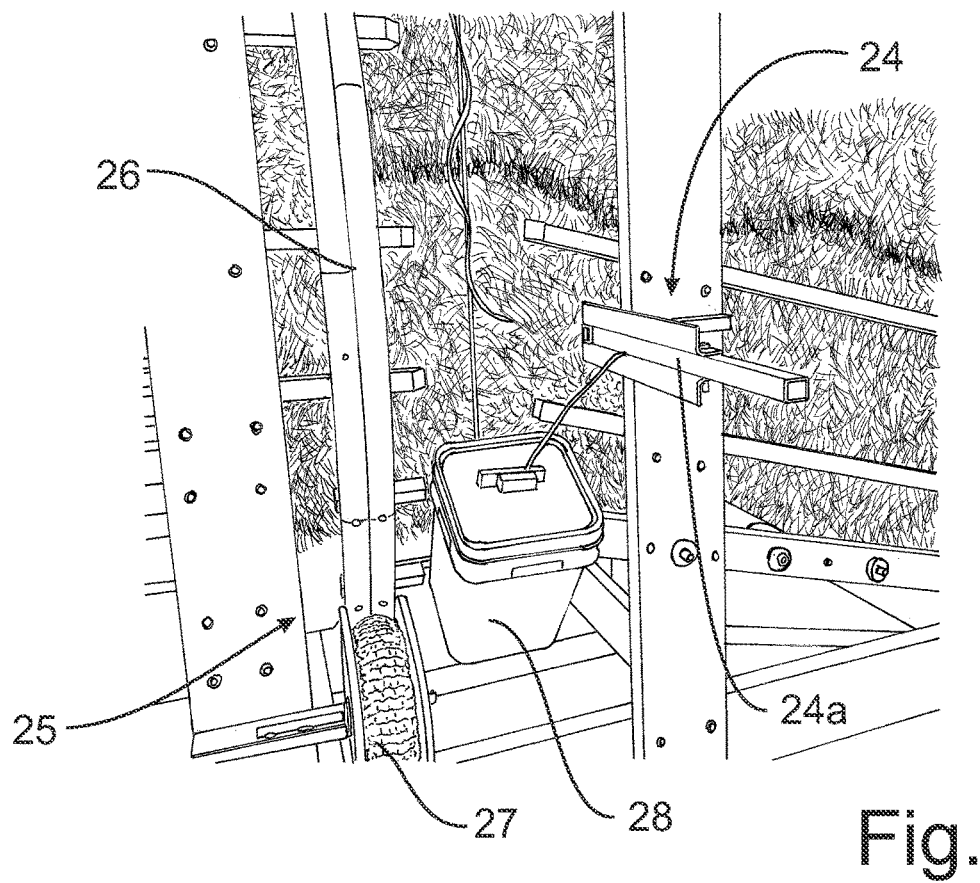
Fig. 23

Fig. 27
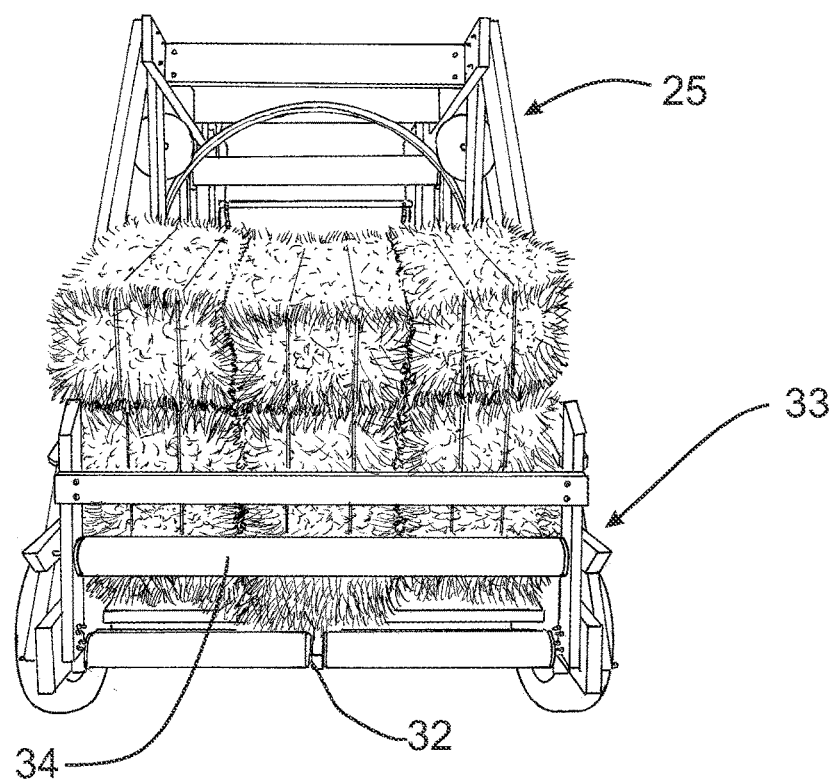
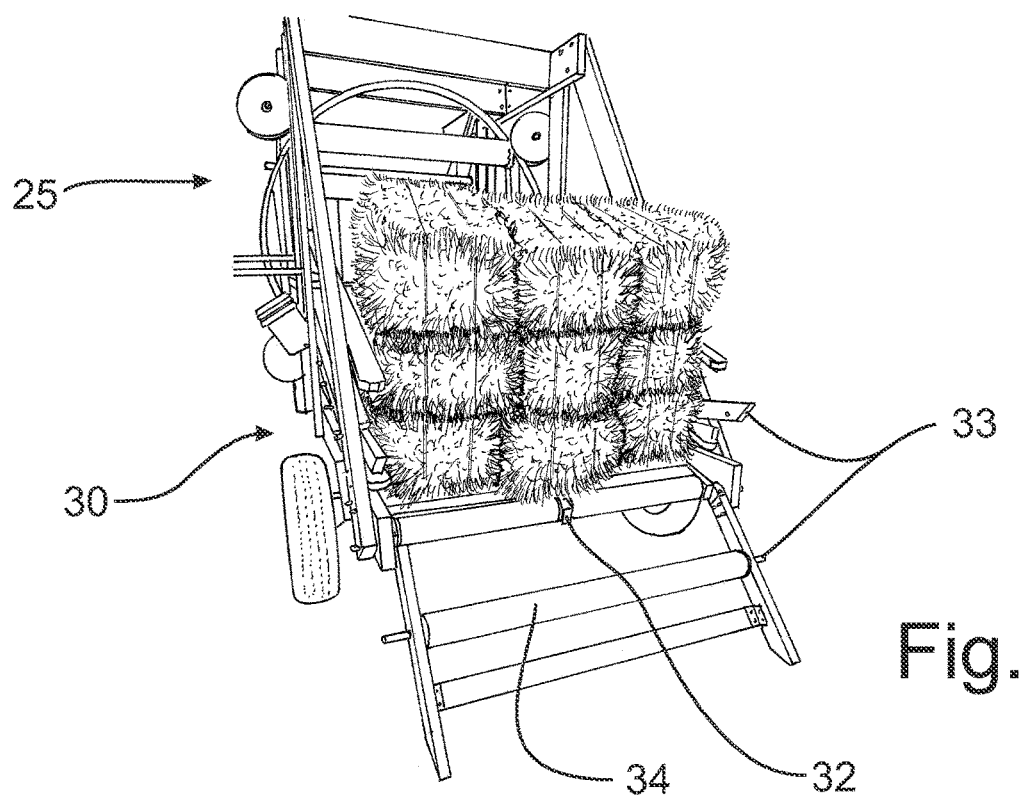
Fig. 28

Fig. 31
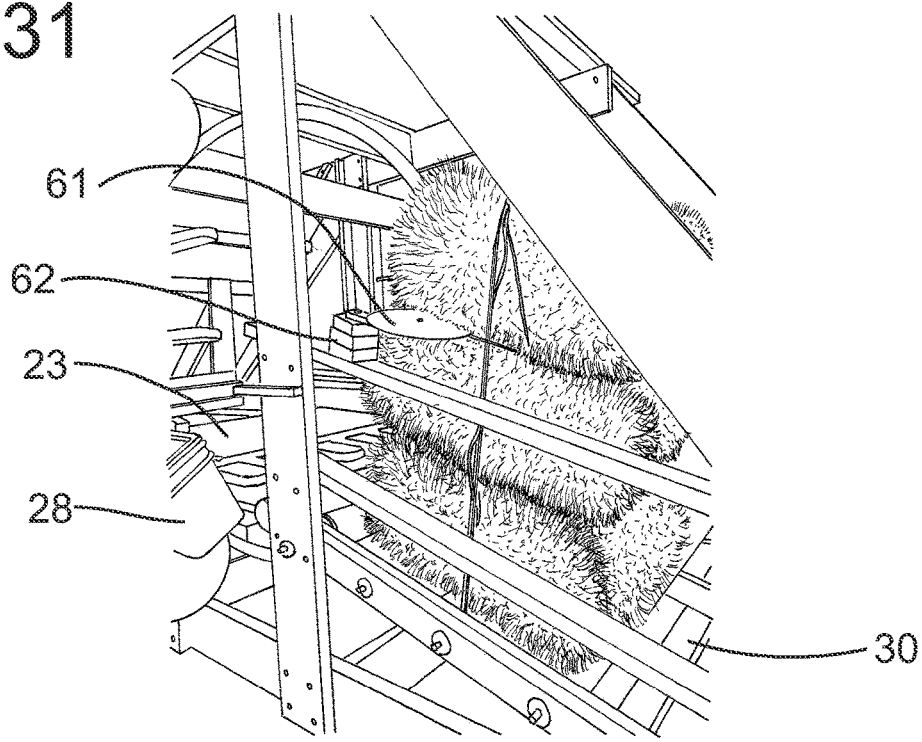
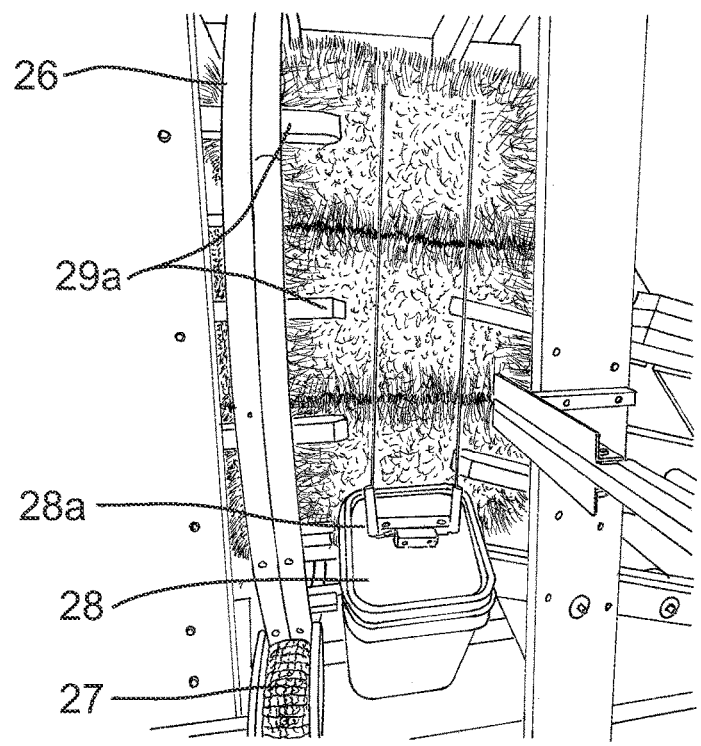
Fig. 32

BALE HANDLER FOR SMALL RECTANGULAR BALES

CROSS-REFERENCE TO RELATED APPLICATIONS

This patent application claims domestic priority from U.S. Provisional Patent Application Ser. No. 63/460,823, filed on Apr. 20, 2023, the content of which is incorporated herein by reference.

FIELD OF THE INVENTION

The present invention generally relates to an apparatus for receiving rectangular bales directly from the baling, and, more particularly, to a a bale handling apparatus that is operable to form cubes of rectangular bales that can be placed directly onto a flatbed truck or a trailer for shipment of the cube of bales to market or to storage.

BACKGROUND OF THE INVENTION

The harvesting of forage crop, such as hay, is typically terminated with the placement of the forage crop into bales for the convenience of handling and storage. Initially, the only choice of equipment for the baling of forage crops was the square baler. Such baling equipment produced rectangular shaped bales of hay having a somewhat square cross-sectional shape. Depending on the kind of crop being baled, these bales would have a weight of perhaps 40-60 pounds, which enabled a manual handling of each respective bale, from stacking the bales on a wagon for transport or stacking them in a barn for storage.

In the 1960's, mechanized handling of these small rectangular bales was developed, as is represented in U.S. Pat. No. 3,549,023, granted on Dec. 22, 1970, to Edward C Backman, in which a self-propelled machine would be driven through the field to pick up bales of hay and convey the bales onto devices that would arrange the bales in tiers to build a stack of bales of hay that could be left along the side of the field for storage, or placed on a truck for transport to market as is depicted in the Backman patent. Another configuration of a bale wagon used to provide rows and tiers of bales to create a stack of bales can be found in U.S. Pat. No. 3,430,783, granted to Lee Dennis Butler on Mar. 4, 1969.

Ultimately, the farm machinery industry developed machines for the formation of bales of hay that included both round bales and large rectangular bales. These round and large rectangular bales were typically formed in the range of one thousand to fifteen hundred pounds per bale. Of course this size of bales of forage crop could no longer be handled manually, and required additional mechanization in order to collect, store and distribute the hay from the bales into feed for animals, such as cattle. Although the small square bale industry has not been eliminated, the enlarged number of choices in machinery to form bales of different shapes and sizes, has reduced the numbers of small square balers being sold each year.

The farm machinery industry created different configurations of machine and apparatus for handling the larger sizes and shapes of bales of forage crops. In the way of examples, one such apparatus was created to pick up the large rectangular bales as shown in U.S. Pat. No. 4,971,504, issued on Nov. 20, 1990, to Kenneth Klompien, in which a pick-up device sized to handle the weight and shape of the large rectangular bales would engage such a bale in the field and elevate the bale onto a table where a stack is created until deposited at a remote location for storage. A different configuration for handling large rectangular bales is depicted in U.S. Pat. No. 10,178,831, granted to Gary L. Kelderman on Jan. 15, 2019, wherein the bales are received by an accumulator and then transferred into a stacking apparatus to add extra capacity to the accumulator.

A hay bundler for stacking small square bales is disclosed in U.S. Pat. No. 7,322,173, granted to Gilles H. Desnoyers on Jan. 29, 2008 in which the apparatus is trailed behind a small square baler. An operator stacks bales in a horizontal layer and then manipulates the apparatus to rotate the layer into a vertical tier. Additional tiers are added until the side clamps grasp the collected bundle of hay bales and wrap the bundle before ejecting the wrapped bundle to the ground. An apparatus is shown in U.S. Pat. No. 5,501,562, issued on Mar. 26, 1996, to Lawrence Zimmerman, in which the collection apparatus creates a pyramidal stack of six bales.

Accordingly, it would be desirable to provide a bale bundling apparatus that can receive small square bales directly from a small square hay baler and create cubes of of nine to twenty-seven individual bales of hay, wrapped with string, netting or plastic, as desired and placed onto the ground for subsequent pick up by a tractor with a front end loader and a bale clamp.

SUMMARY OF THE INVENTION

It is an object of this invention to overcome the disadvantages of the prior art by providing a bale handling apparatus operable to create a predefined stack of the bales for improved handling.

It is another object of this invention to provide an agricultural machine that receive a plurality of small rectangular bales of forage crop and form the bales into a cubic-like stack bound together by a circumferentially placed wrapping material.

It is a feature of this invention that the bale handling apparatus can be coupled to the rearward end of a baling machine so as to receive small rectangular bales directly from the baling machine.

It is an advantage of this invention that the bale handling apparatus forms a module stack of bales that is three bales wide and three bales high.

It is another advantage of this invention that the module stack of bales can be matched with two additional module stacks of bales to create a cubic stack of bales that is three bales wide, three bales high and three bales long.

It is another feature of this invention that a wrapping mechanism is incorporated into bale handling apparatus to encompass the formed cubic stack of bales with a wrapping material to bind the stacked bales together.

It is another feature of this invention that the bale handing apparatus includes a discharge section having a floor that will accommodate multiple cubic stacks of bales for discharge from the bale handling apparatus simultaneously.

It is still another feature of this invention that the bale handling apparatus includes an elevator that collects an array of bales that is three bales wide for delivery to a stacking mechanism to create a module of stack of bales.

It is still another advantage of this invention that the elevator is provided with a lateral shuttle mechanism that locates a centrally delivered small rectangular bale to first one side of the elevator and then to the opposing side of the elevator before receiving a final bale in the center between the first two bales.

It is yet another feature of this invention that the elevator is also provided with a drive mechanism that moves the accumulated bales upwardly toward a discharge point after all three bales have been collected on the elevator.

It is yet another advantage of this invention that a row of accumulated bales are discharged from the elevator onto a table that vertically moves to be positioned to receive three rows of accumulated bales on tope on one another.

It is a further feature of this invention that a pusher plate is operable to move the three accumulated rows of bales from the table into a wrapping mechanism so that the table can be raised to receive the next accumulated row of bales.

It is a further advantage of this invention that the cubic stack of bales can be wrapped with any desired wrapping material, including twine, netting and plastic.

It is a further object of this invention to provide an apparatus for handling small rectangular bales of forage crop to create cubic stacks secured by wrapping material which is durable in construction, inexpensive of manufacture, carefree of maintenance, facile in assemblage, and simple and effective in use.

These and other objects, features and advantages are accomplished according to the instant invention by providing a bale handling apparatus operable to receive bales from a square baler and create cubic stacks of bales for discharge from the bale handling apparatus. The bale handing apparatus includes an elevator provided with a lateral shuttle mechanism that creates rows of three laterally aligned bales, and a stacking mechanism that receives accumulated rows of bales from the elevator to create a vertical module of bales. The stacking mechanism includes a pusher plate that pushes the bale modules toward a wrapping apparatus that wraps an accumulated cubic stack of bales with wrapping material to establish integrity to the cubic stack. The cubic stacks are retained on a discharge floor extending rearwardly from the wrapping mechanism until a predetermined number of cubic stacks can be discharged at a desired location for subsequent pick-up and storage.

BRIEF DESCRIPTION OF THE DRAWINGS

The advantages of this invention will be apparent upon consideration of the following detailed disclosure of the invention, especially when taken in conjunction with the accompanying drawings wherein:

FIG. 8 is a schematic detail view of the bale bundling apparatus shown in FIG. 7 to show the utilization of the angled guides on both the left and right sides at the top of the elevator to compress the bales toward the center of the elevator to make a tight row of accumulated bales;

FIG. 9 is a schematic front elevational view of the bale bundling apparatus shown in FIG. 7, but depicting the movement of the first row of bales from the upper portion of the elevator onto the scissor lift table;

FIG. 16 is a schematic partial right side perspective view of the bale bundling apparatus shown in FIG. 14;

FIG. 17 is a schematic enlarged partial right side elevational view of the bale bundling apparatus shown in FIG. 14 but with the pusher plate moving the first cubic stack of bales through a wrapping position;

FIG. 23 is a schematic partial left side elevational view of the wrapping mechanism showing the completion of the wrapping cycle with the twine held by the cut and clamp mechanism;

FIG. 24 is a schematic right side elevational view of the bale bundling apparatus with a second cubic stack of bales on the scissors lift table directly behind the first cubic stack of bales;

FIG. 27 is a schematic rear elevational view of the bale bundling apparatus shown in FIG. 26 with the first cubic stack of bales being positioned against the upright discharge ramp;

FIG. 28 is a schematic rear perspective view of the bale bundling apparatus shown in FIG. 27 but with the discharge ramp lowered to allow the wrapped cubic stack of bales to be discharged onto the ground;

FIG. 31 is a schematic partial left side elevational view of a wheel used to tuck the loose bale twine when the twine is cut between the top and middle bales; and FIG. 32 is a schematic partial left side elevational view depicting an alternative twine wrapping mechanism.

DETAILED DESCRIPTION OF THE PREFERRED EMBODIMENT

Figure 1:
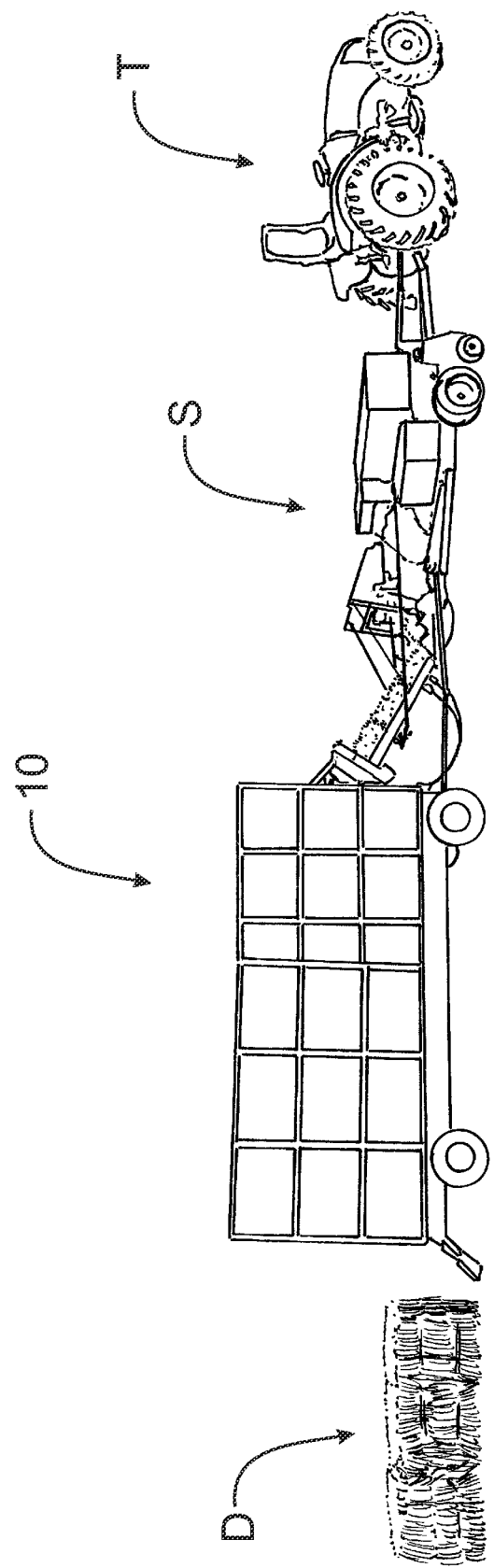
FIG. 1 is a schematic diagram showing the environmental use of the bale bundling apparatus incorporating the principles of the instant invention as being connected to the rear of a square baler being towed and powered by a tractor for movement over the fields to bale forage crop.

Referring to the drawings, a bale bundling apparatus incorporating the principles of the instant invention can best be seen. Left, right, front and rear references are use as a matter of convenience and are determined by standing at the rear of the bale bundling apparatus where the discharge ramp is located and facing the forward direction of travel. The bale bundler 10 has a wheeled frame 11 with a forwardly oriented tongue 12 for connection to a prime mover T or to the rearward end of a small square baler S so that the discharge of bales from the bale chute of the baler S, which is aligned with the central entryway 14 of the bale bundler 10, discharges a bale onto the lower, central position of the elevator floor 16 of the bale bundler 10.

The bale bundler 10 includes an elevator 15 having an upwardly sloped elevator floor 16 terminating at an upper edge. The elevator 15 further includes a lateral shuttle mechanism 17 moveable in a transverse direction, as will be described in greater detail below and preferably a pair of push bars 18 spaced approximately 180 degrees apart connected to a pair of transversely spaced endless chains 19 movable along the elevator floor 16. Preferably, the elevator floor 16 is formed from a low friction material to facilitate the movement of the bales along the elevator floor 16 by the push bar 18 and the elevator chains 19. The movement of the lateral shuttle mechanism 17 and the elevator chains 19 is powered by a hydraulic system 40 as shown in the hydraulic diagram of FIG. 30 and described in greater detail below.

The bale bundler 10 further includes a scissors lift mechanism 20 that is vertically movable rearwardly of the elevator 15. The scissors lift mechanism 20 is preferably formed with a scissors linkage 22 that contracts and expands with the vertical movement of the table 23. The scissors lift mechanism 20 is positionable along three or four vertically spaced stops, as will be described in greater detail below, to collect rows of bales into a vertically oriented stack on the table 23 as the respective rows of bales are pushed off the elevator floor 16 over the upper edge. A positionally adjustable transverse elevator stop member 21a is located rearwardly of the vertical path of movement to keep the bales in alignment as they are moved downwardly by the scissors lift mechanism 20.

A wrapping apparatus 25 is located rearwardly of the elevator stop member 21a to wrap the cube of bales being passed through the wrapping mechanism 25. Preferably, the wrapping mechanism 25 includes a ring 26 supported on circumferentially spaced wheels 27 to wrap twine around the cube of bales after the forwardly positioned pusher plate 29 moves the cube of bales off the scissors lift table 23 and through the wrapping mechanism. A cut and clamp apparatus 24 to mounted on the frame 11 rearwardly of the ring 26 to manipulate the twine being used to wrap the cube of bales, as will be described in greater detail below. One of ordinary skill in the art will recognize that the wrapping mechanism 25 can be configured to wrap netting, twine or plastic around the cubic stack of bales, or any desired wrapping material, depending on the preference of the operator and the end purpose of the bales. For example, wrapping plastic around the cube of bales can result in ensiling the hay to create haylage.

Rearwardly of the wrapping mechanism 25, the downwardly sloping discharge floor 30 having rollers and a spiked chain mechanism 32 in the middle thereof that is operable to move the wrapped cubes of bales toward the discharge ramp 34. The discharge ramp 34 is pivotally mounted on the rearward end of the discharge floor 30 and is spring-loaded into the upright position. The discharge ramp 34 will pivot downwardly into a discharge position in engagement with the ground to guide the movement of the wrapped cube of bales onto the ground. Alternatively, the pivotal movement of the discharge ramp can be hydraulically controlled. The cubic stack of wrapped bales being discharged from the discharge floor 30 can be accompanied by one or two additional cubes of bales to form a stack of 9, 18 or 27 bales depending on the preset, established operation of the bale bundling apparatus 10.

Figure 2:
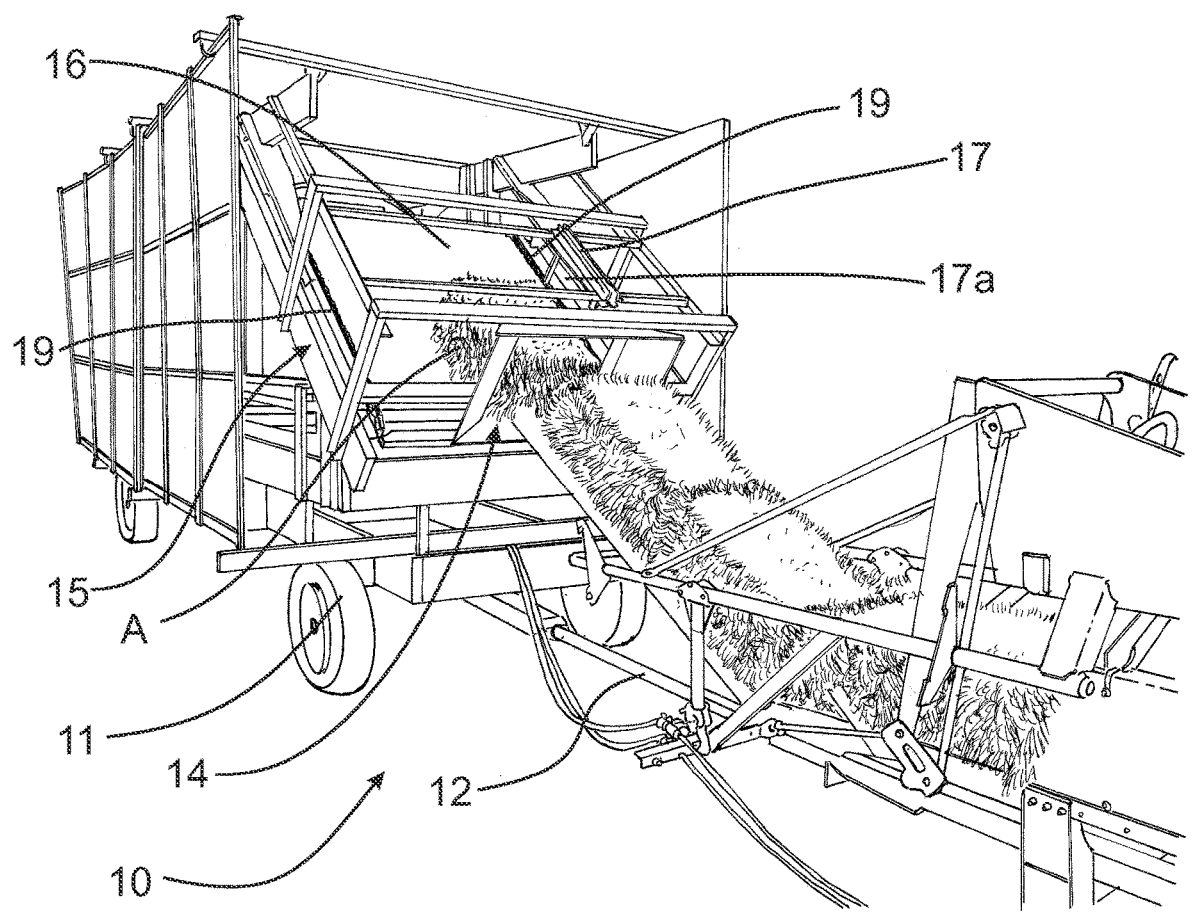
FIG. 2 is a schematic front, right perspective view of the bale bundling apparatus with a bale placed thereon by the small square baler.
Figure 3:
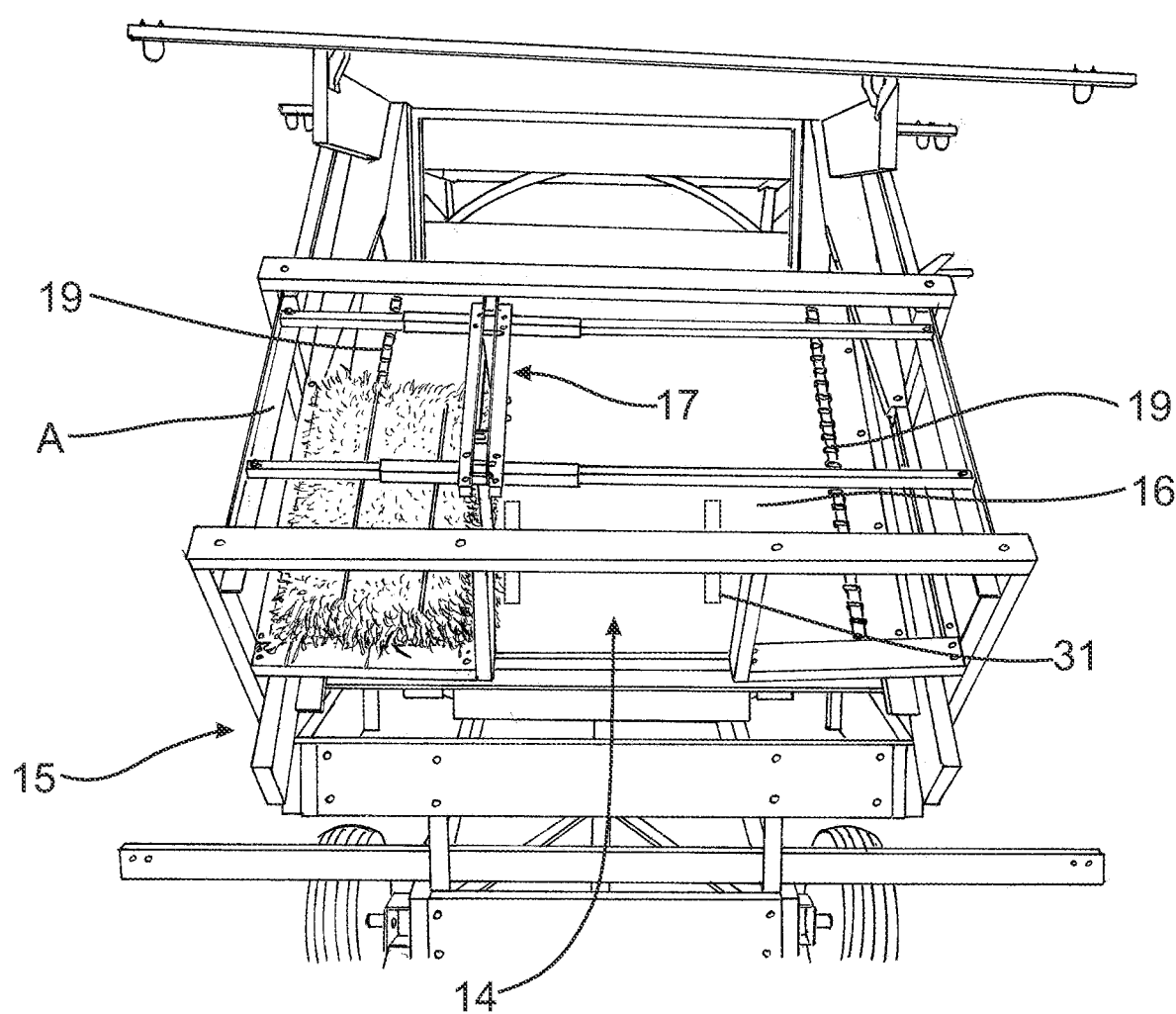
FIG. 3 is a schematic front elevational view of the bale bundling apparatus shown in FIG. 2, but having the first bale moved to the right side of the elevator by a lateral shuttle.
Figure 4:
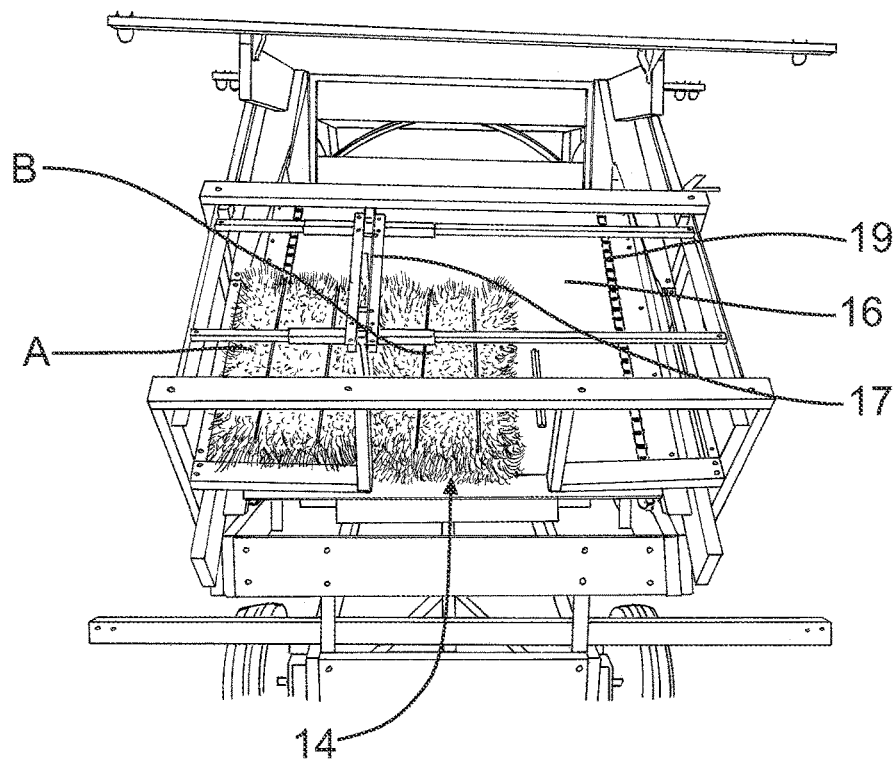
FIG. 4 is a schematic front elevational view of the bale bundling apparatus shown in FIG. 3, but having a second bale placed in the middle of the elevator by the small square baler.
Figure 5:
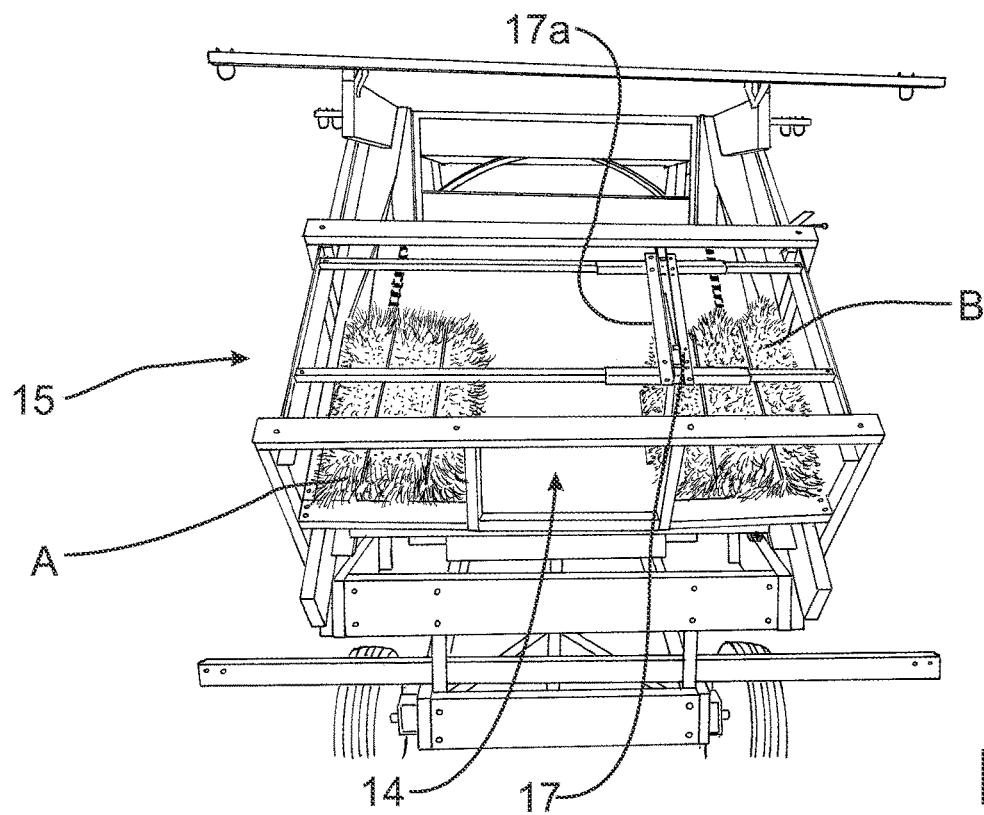
FIG. 5 is a schematic front elevational view of the bale bundling apparatus shown in FIG. 4, but having the second bale moved to the left side of the elevator by the lateral shuttle.
Figure 6:
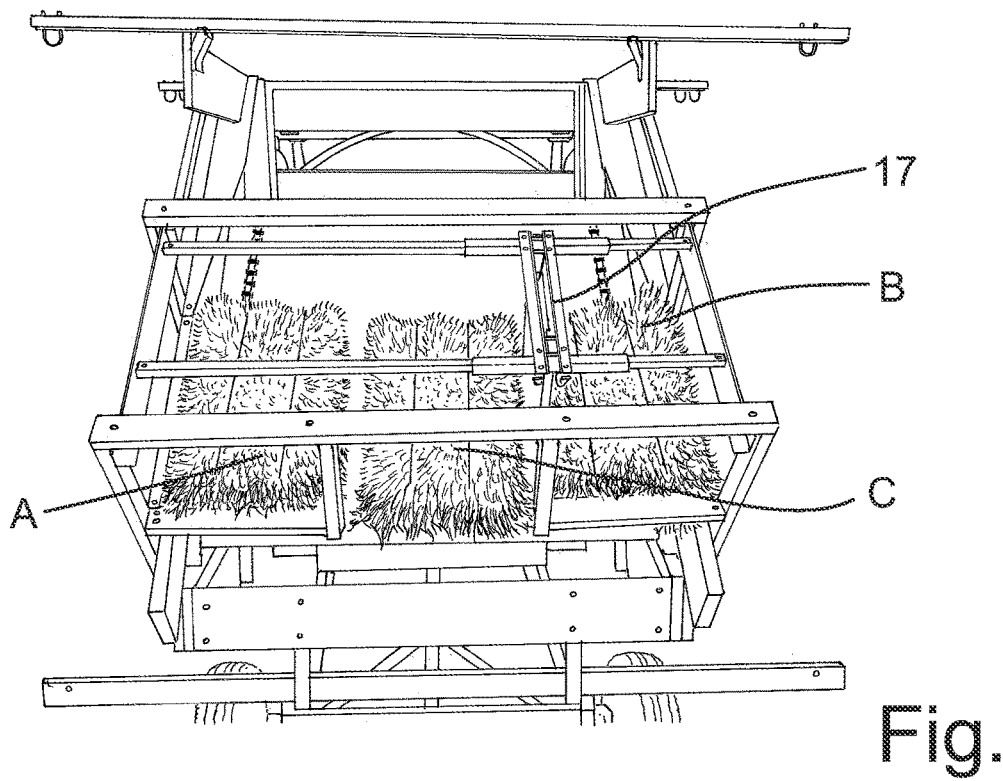
FIG. 6 is a schematic front elevational view of the bale bundling apparatus shown in FIG. 5, but having a third bale placed directly into the middle of the elevator between the first and second displaced bales by the small square baler.

The operation of the bale bundling apparatus 10 can be seen in FIGS. 2-23. In FIG. 2, the baler S has deposited a first small square bale A through the central entryway 14 at the bottom of the elevator floor 16. That first bale A is shifted to the right side of the elevator floor 16 by the operation of the lateral shuttle mechanism 17 powered by a hydraulic cylinder 52 over the top of a floor wedge 31, which assists in maintaining the lateral positioning of the first bale A, while the shuttle blade 17a remains in the position engaged with the side of the first bale A, as is depicted in FIG. 3. The second small square bale B is deposited by the baler onto the elevator floor 16 through the central entryway 14 and for placement at the central position at the bottom of the elevator floor 16, as is represented in FIG. 4. The lateral shuttle mechanism 17 then returns to the left position and thereby moving the second bale B over the second floor wedge 31 to the left position on the elevator floor 16, as is represented in FIG. 5. As shown in FIG. 6, the third small square bale C is then deposited in the central position at the bottom of the elevator floor 16 and completing the first row of bales.

Figure 7:
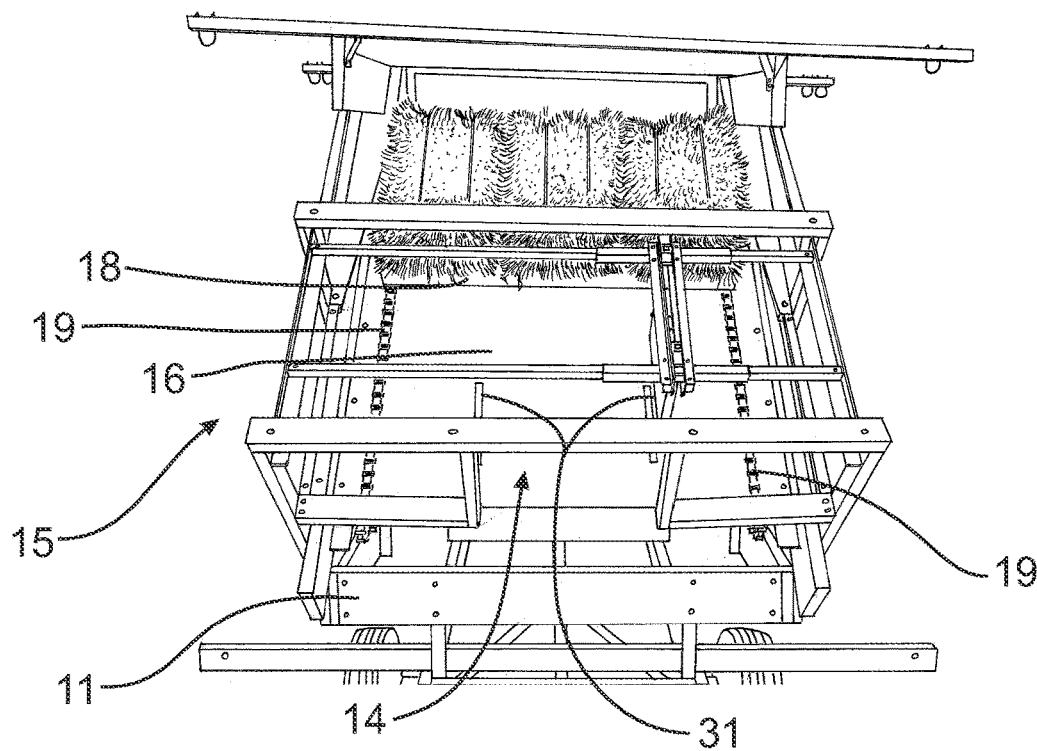
FIG. 7 is a schematic front elevational view of the bale bundling apparatus shown in FIG. 6, but depicting the movement of the first row of three bales upwardly along the elevator floor to an upper position on the elevator.

The push bar 18 connected between the pair of endless chains 19 then moves the first row of bales up the elevator floor 16 to an elevated position, depicted in FIG. 7, by a hydraulic motor 53 and then onto table 23. A second row of bales is then formed along the bottom of the elevator floor 16 as described above. The second push bar 18 and the endless chains 19 are again engaged to move the second row of bales. The result is that the first row of bales deposited onto the scissors lift mechanism 20 is followed by a second row of bales placed on top of the first row of bales, and then ultimately a third row of bales on top of the second row of bales to form a cubic stack of bales. The movement of the lateral shuttle 17, as well as the push bar 18 and endless chains 19 are preferably automatically controlled by the hydraulics system 40 and the electronic controller 35 operably connected to the hydraulics system 40 to manipulate the valve spools 42-48 to cause movement of the appropriate components of the bale bundling apparatus 10 as described herein.

Figure 11:
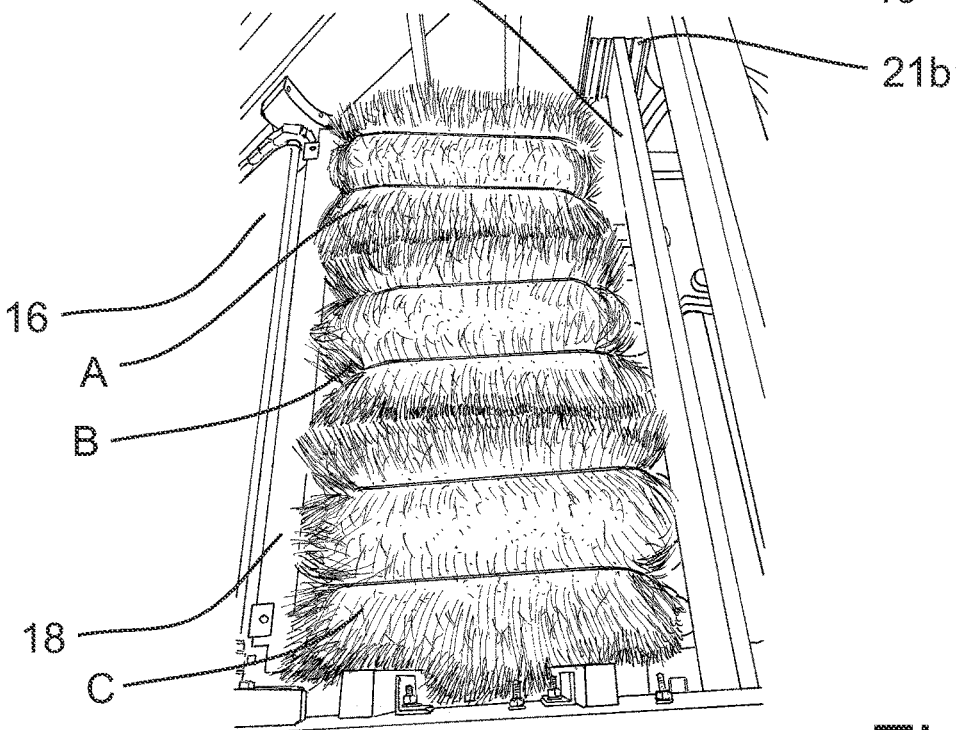
FIG. 11 is a schematic top plan view of the row of accumulated bales placed on the scissor lift table.

As each row of bales passes over the upper edge of the elevator floor 16, an angled guide member 21 on opposite sides of the elevator 15, as depicted on the left side in FIG. 8, compresses the three bales forming the row of bales toward the center to form a tight row of bales before being deposited onto the scissors lift mechanism 20. A positionally adjustable stop member 21a, best seen in FIG. 11, is supported by the frame 11 to stop the rearward movement of the bales moving over the upper edge of the elevator floor 16. The fore and aft positional adjustment of the stop member 21a accommodates different lengths of bales as produced by the small square baler (not shown). The row of bales deposited onto the lift table are held firmly in place by the side rails, positionally adjustable stop member 21a and the elevator push bar 18 that is in a parked position while the next row of three bales is being formed. Bracket 21b supports the stop member 21a and provides multiple slots into which the stop member 21a can be placed to accommodate the different lengths of bales for which the square baler S is configured to produce.

Figure 10:
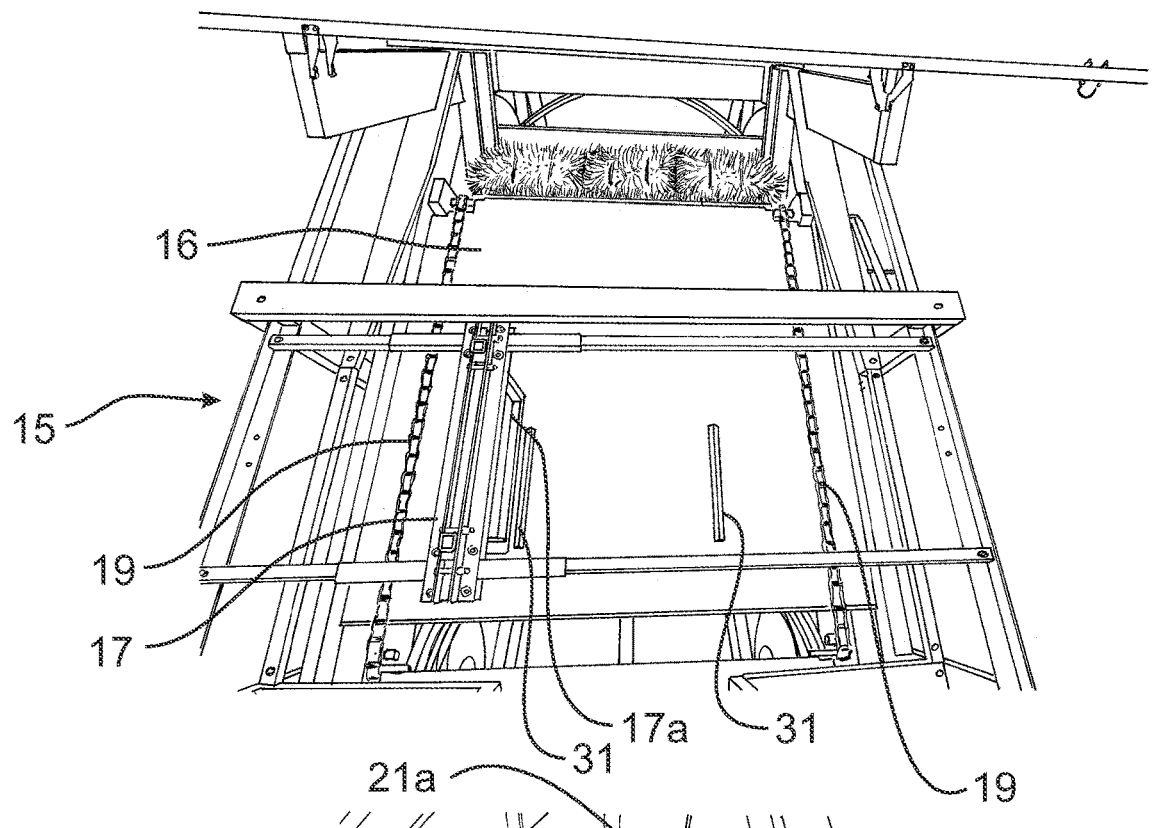
FIG. 10 is a schematic upper perspective view of the bale bundling apparatus shown in FIG. 9 with the first row of bales placed onto the scissor lift table.
Figure 12:
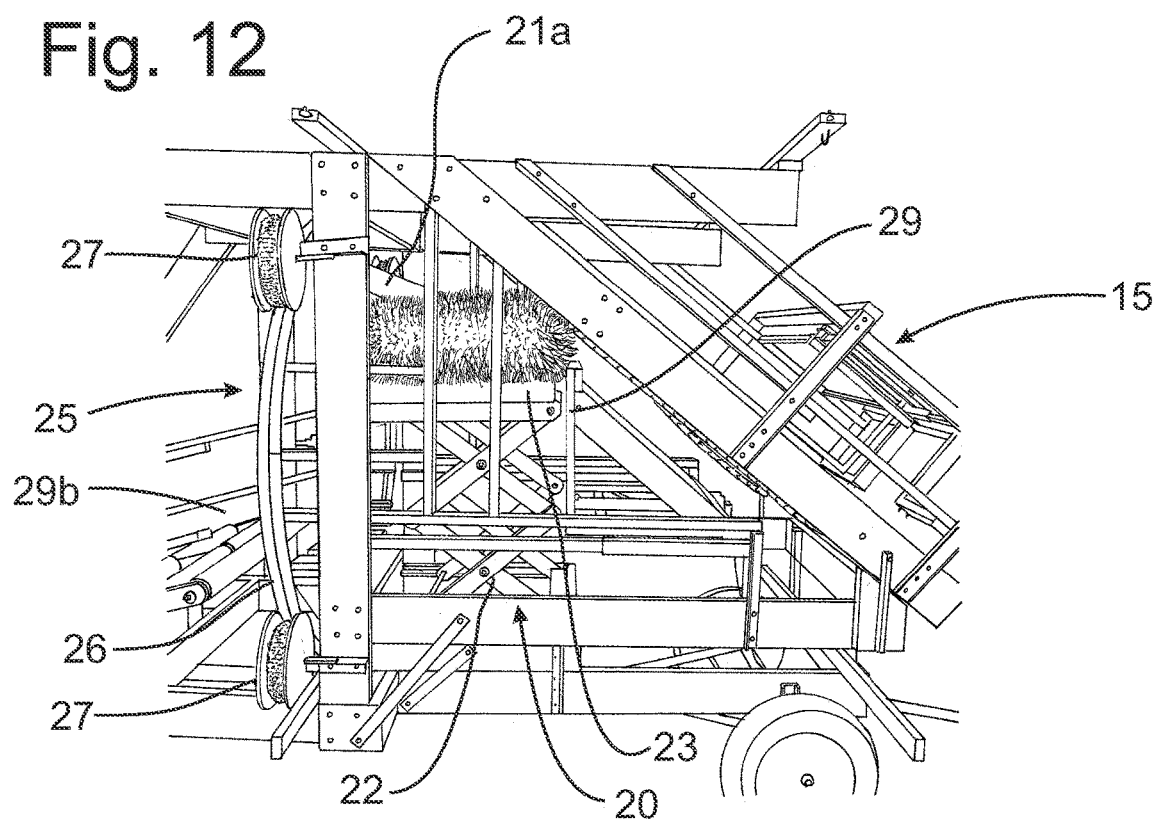
FIG. 12 is a schematic partial right side elevational view of the bale bundling apparatus showing the downward movement of the scissors lift table to move the first row of bales to a middle position to receive the next row of accumulated bales on top of the first row of bales.
Figure 13:
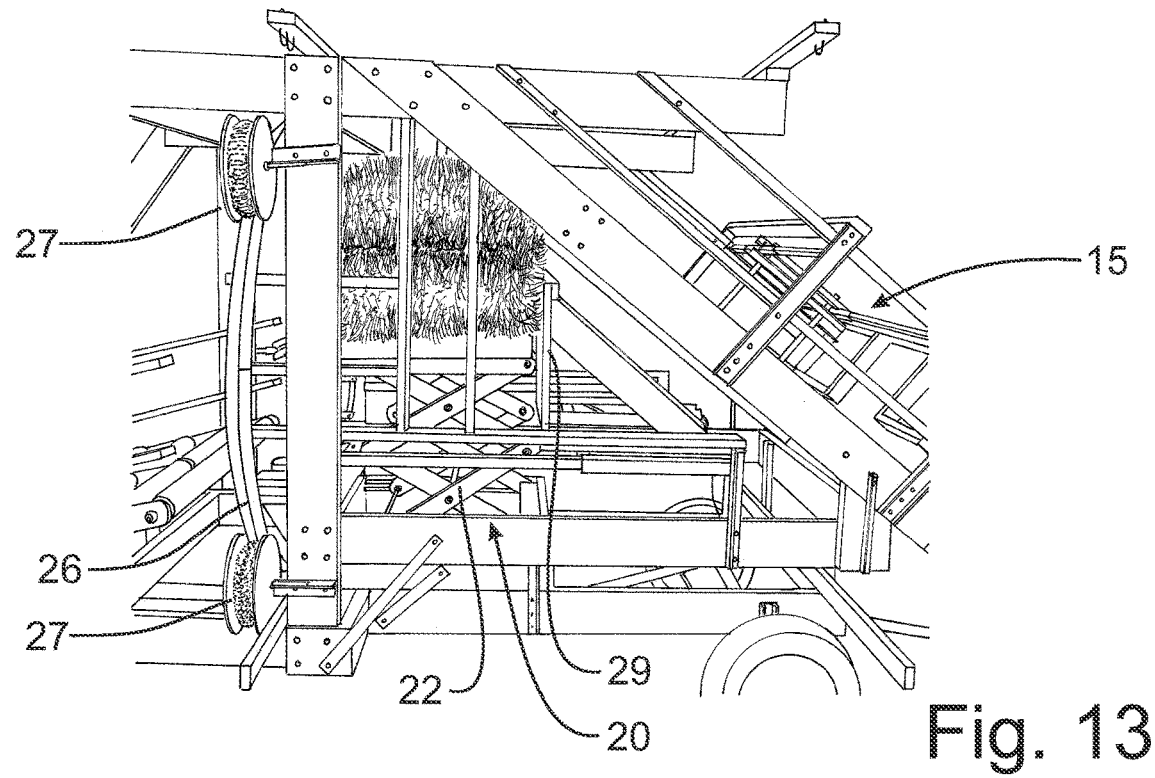
FIG. 13 is a schematic partial right side elevational view of the bale bundling apparatus shown in FIG. 12 with a second row of bales placed on top of the first row of bales on the scissors lift table.

The scissors lift table 23 is supported by the expanding scissors linkage 22 and is positioned by a hydraulic cylinder 54 at an uppermost position in order to receive the first row of bales onto the table 23, as is reflected in FIGS. 9 and 10. As seen in FIG. 12, the vertical movement of the scissors linkage 22 occurs rearwardly of a hydraulically powered pusher plate 29. Once the first row of bales is received on the table 23, the hydraulic cylinder 54 then retracts to contract the scissor linkage 22 and lower the table 23 to a middle position to receive a second row of bales, as is reflected in FIG. 12. The receipt of the second row of bales on top of the first row of bales is depicted in FIG. 13.

Figure 14:
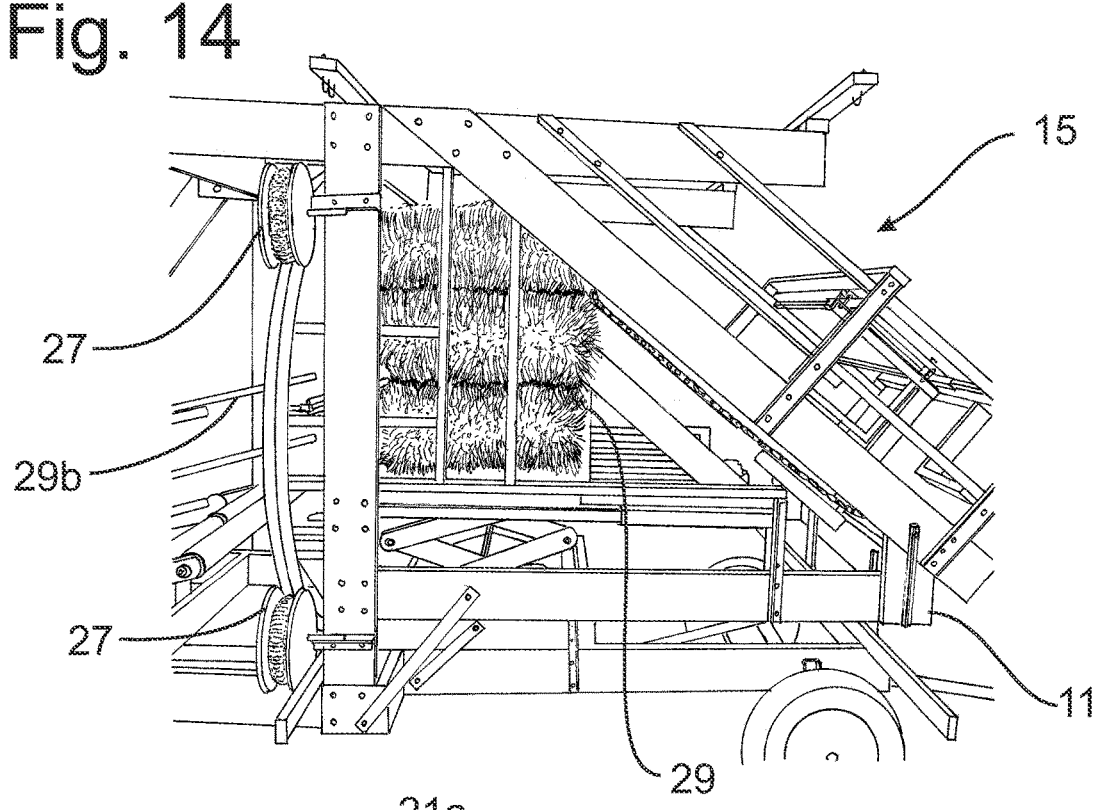
FIG. 14 is a schematic partial right side elevational view of the bale bundling apparatus shown in FIG. 13 with the scissors lift table moved to a lowered position and a third row of bales placed onto the top of the second row of bales.
Figure 15:
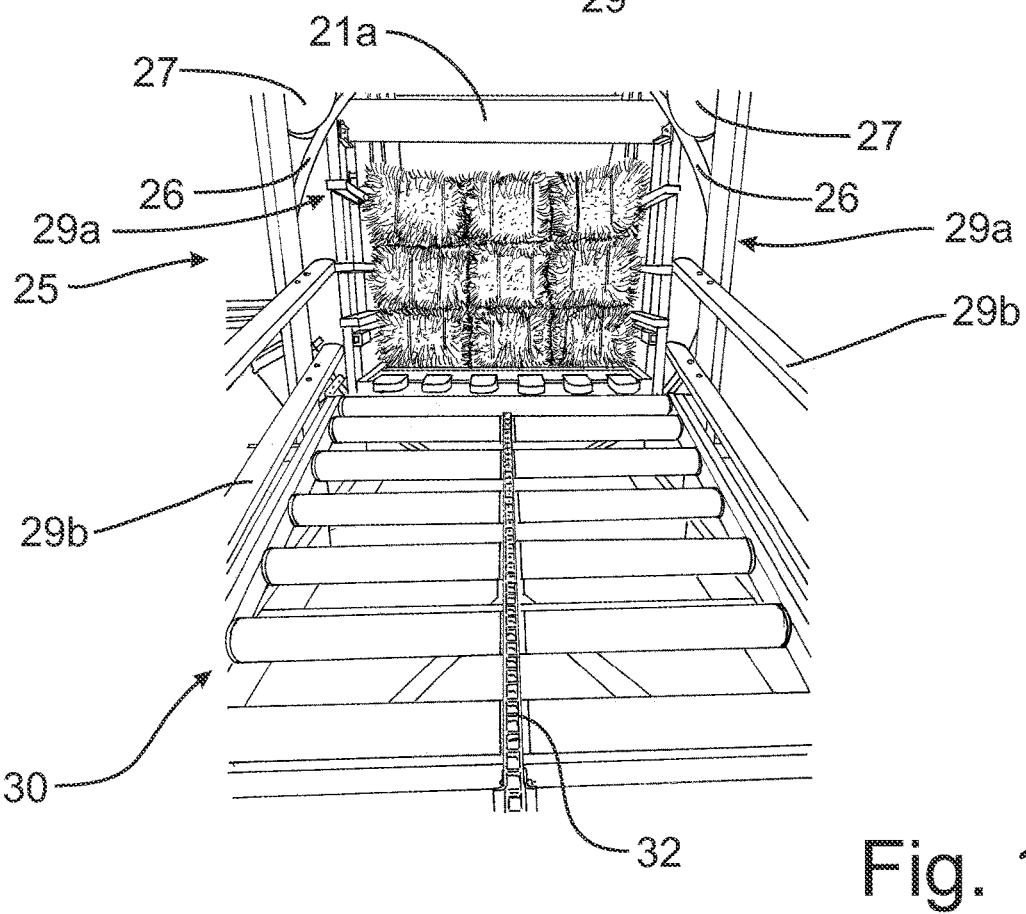
FIG. 15 is a schematic rear elevational view of the bale bundling apparatus shown in FIG. 14 with three rows of bales supported by the scissors lift table.
Figure 18:
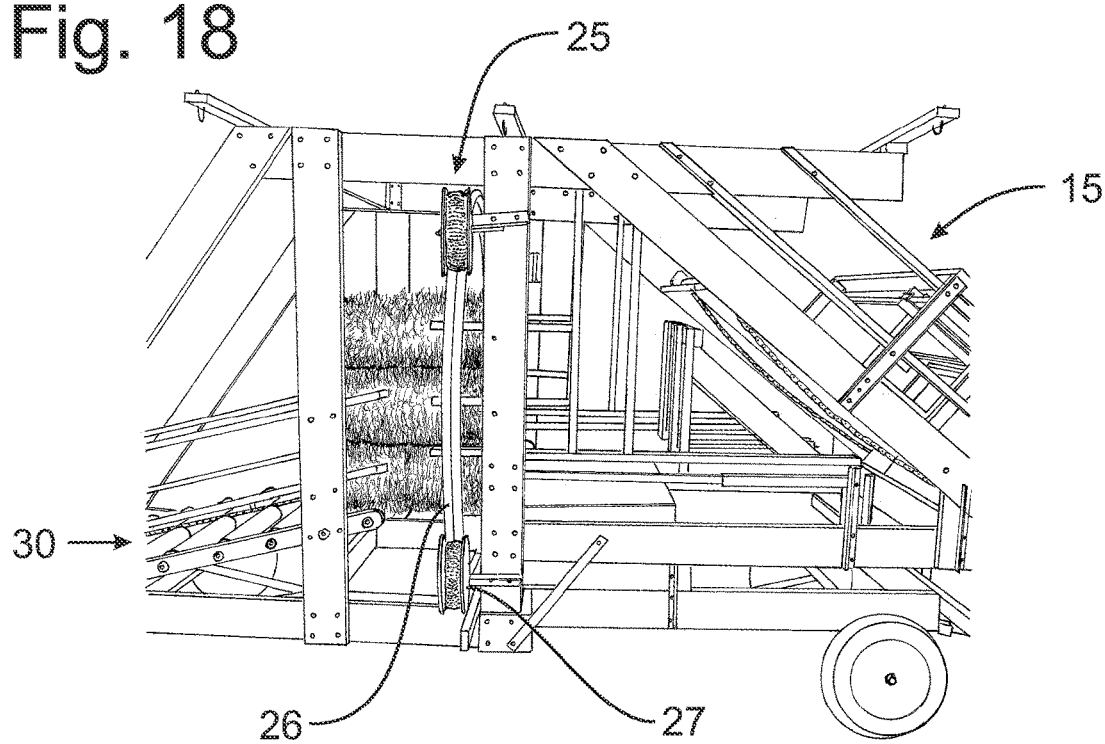
FIG. 18 is a schematic side elevational view of the bale bundling apparatus shown in FIG. 17 with the pusher plate retracted to receive a second cube of bales on the scissors lift table.
Figure 19:
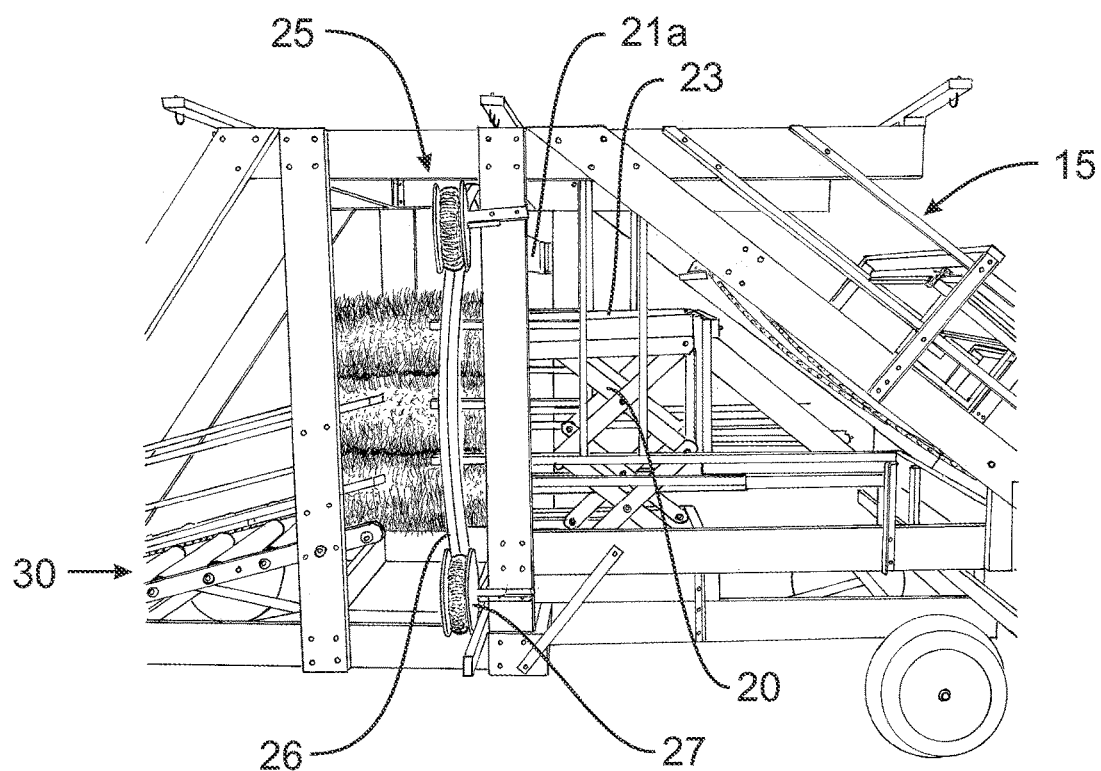
FIG. 19 is a schematic side elevational view of the bale bundling apparatus shown in FIG. 18 but with the scissors lift table being raised to receive additional rows of accumulated bales from the elevator.
Figure 20:
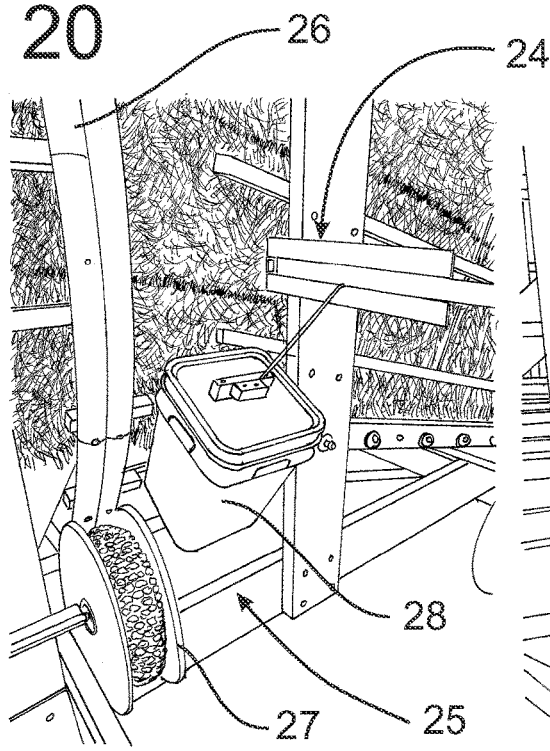
FIG. 20 is a schematic enlarged partial left side elevational view of the bale bundling apparatus showing portions of the wrapping apparatus with twine extending from the twine dispensing device to the cut and clamp mechanism.
Figure 21:
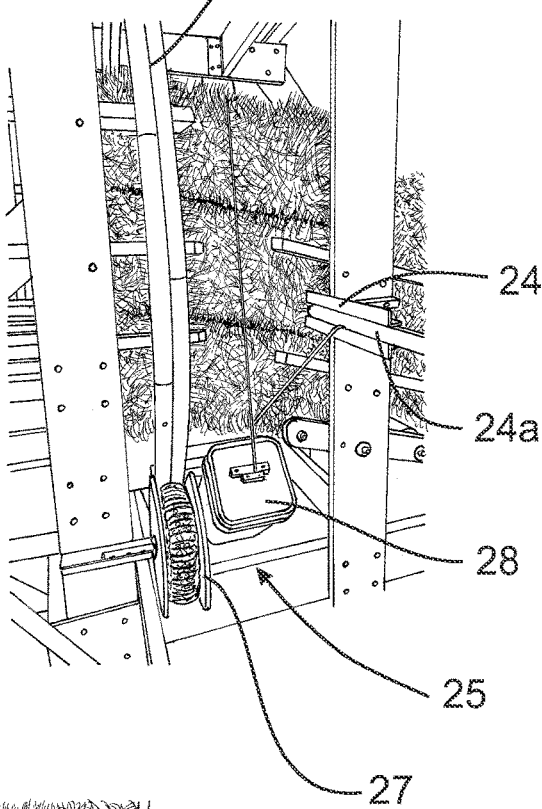
FIG. 21 is a schematic enlarged partial left side elevational view of the wrapping apparatus with the twine wrapped around the cubic stack.

As with the receipt of the first row of bales on the table 23, the placement of the second row of bales results in the table 23 being lowered to a lower position for the receipt of a third row of bales, as is demonstrated in FIG. 14. The third row of bales at the top of the stack of bales positioned on the scissors lift mechanism 20, as shown in FIG. 15, does not clear the stop member 21a. The table 23 is then lowered to a lowermost position to clear the stop member 21a and to trigger the movement of the pusher plate 29, powered by the dual hydraulic cylinders 55, to push the cube of nine bales rearwardly into the wrapping mechanism 25, as is shown in FIGS. 16 and 17. Side rails 29a compress and center the cube of bales being pushed rearwardly by the pusher plate 29 into the wrapping mechanism 25.

As depicted in FIGS. 20-23, the preferred wrapping mechanism 25 utilizes twine as the wrapping material and is formed with a wrapping ring 26 that is rotatably supported on the frame by support wheels 27, one of which is powered by the hydraulic motor 56 to cause the wrapper ring 26 to rotate around the cube of bales passing through the wrapper ring 26. A twine dispensing device 28 is secured to the wrapper ring 26 to rotate with the wrapper ring 26 and wrap twine around the cube of bales within the wrapper ring 26. The twine dispensing device 28 contains a ball of twine for wrapping the nine-bale cube. The end of the twine is initially clamped in a cut and clamp mechanism powered by hydraulic cylinder 57. The wrapper ring 26, powered by a hydraulic motor 56, moves the twine dispensing device 28 counterclockwise (viewed from the rear of the bale bundling apparatus 10) around the nine bale cube wrapping the cube of bales with twine.

Figure 22:
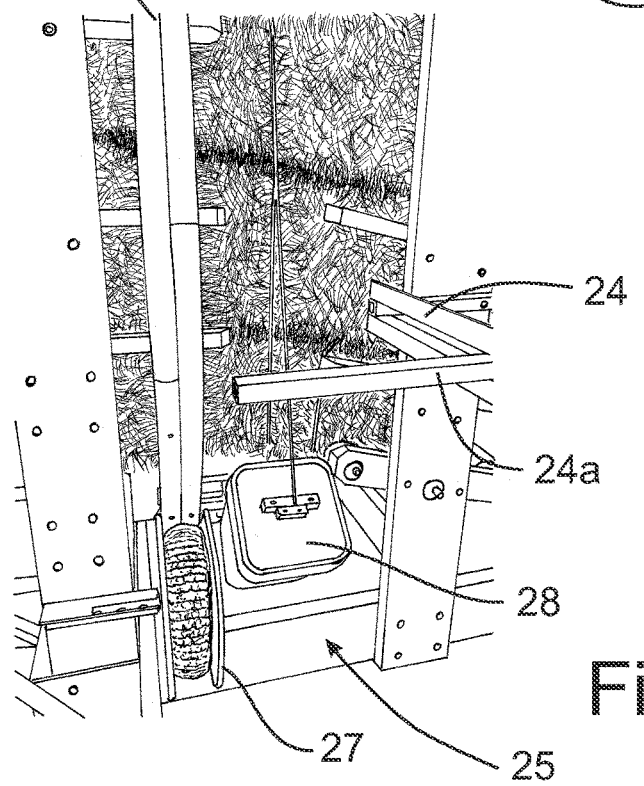
FIG. 22 is a schematic partial left side elevational view of the wrapping mechanism with the cut and clamp mechanism positioned for the clamp bar to engage the twine and pull the twine into the cut and clamp mechanism to sever and hold the twine.

A twine tension clamp on the cover of the twine dispensing device 28 enables the wrapping mechanism 25 to tightly wrap the cube with twine. After several revolutions of wrapping the cube of bales and when the twine box is on the opposite (right) side of the bale cube, the cut and clamp mechanism moves to the open position, as is depicted in FIG. 22, to pivot the clamp bar 24a into a longitudinal orientation outside of the twine dispensing device 28 to allow the twine dispensing device 28 to keep rotating with the ring 26. This movement of the clamp bar 24a releases the original twine tail, which then gets covered with additional wraps of twine to prevent a loose dangling twine tail. Preferably, the wrapping mechanism 25 applies multiple wraps of twine at a central location of the cube of bales corresponding to a gap between the first set of side rails 29a and the second set of side rails 29b to keep the cube together as the cube of bales is moved along the discharge floor 30 and then onto a truck or trailer after being discharged from the bale bundler 10.

After the nine-bale cube has several wraps of twine around it, the wrapper ring 26 with twine dispensing device 28 stops rotating. The twine dispensing device 28 stops in the home position on the left side of the bale bundling apparatus 10 for easy access as it is normal to climb off the left side of the tractor pulling the baler and the bale bundling apparatus 10. The cut and clamp mechanism 24 closes through movement of the small hydraulic cylinder 57 to pivot the clamp bar 24a back into the home position of the cut and clamp mechanism 24. The top side of the cut and clamp mechanism 24 cuts the twine when the clamp bar 24a presses the twine into engagement against a knife edge releasing the top twine tail. The bottom side of the cut and clamp mechanism 24 clamps the twine coming out of the twine box by the return engagement of the clamp bar 24a. The twine from the twine box is held firmly in the cut/clamp mechanism ready to wrap the next cube of bales delivered into the wrapper ring 25. The wrapper ring 25 rotates counter-clockwise so the top twine tail when cut dangles down from the top of the cube and does not fall on the ground. The top twine tail is then pushed into the bale cube by the side rails 29b as the wrapped cube moves onto the discharge floor 30.

The electronic controller 35 can be programmed to vary the number of wraps placed around a cube of bales. Each cube of wrapped bales consists of nine individual bales arranged in three rows of three bales in each row. The wrapping mechanism 25 wraps only a cube of nine bales and the wrapped cube is moved toward the discharge ramp 34. The controller 35 can be programmed to create a stack of 9, 18 or 27 bales, formed of 1, 2 or 3 wrapped cubes discharged off of the discharge floor 30 at one time by rotational operation of the spiked chain 32 to discharge the selected number of cubes of bales over the lowered discharge ramp 34.

Figure 25:
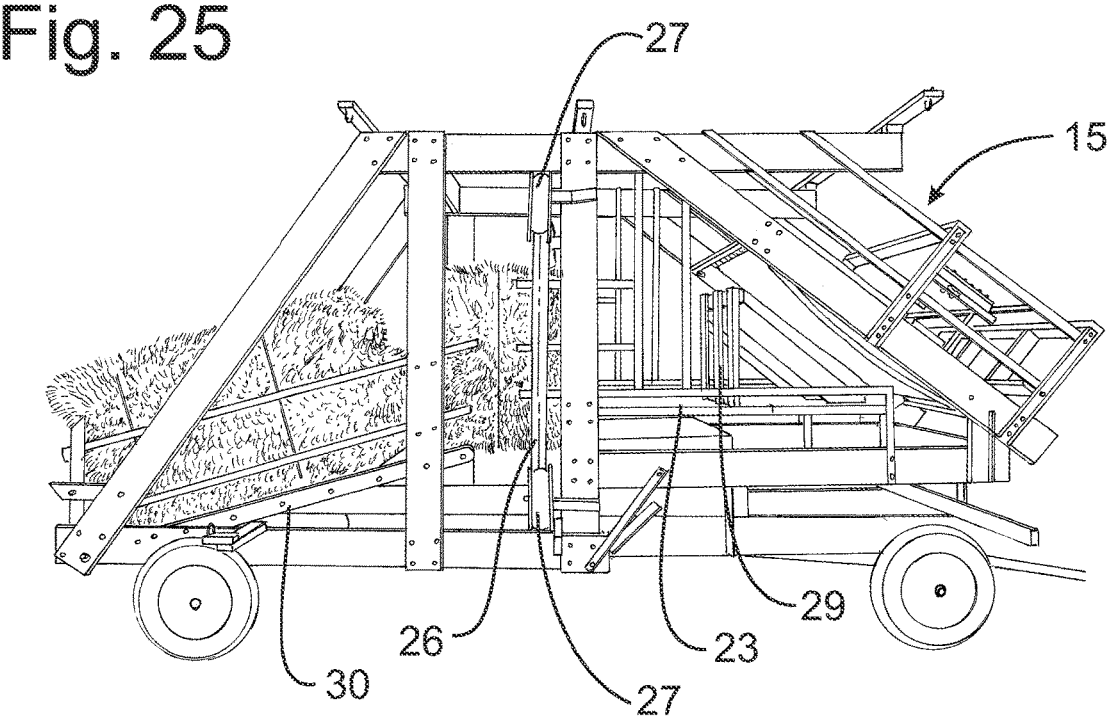
FIG. 25 is a schematic right side elevational view of the bale bundling apparatus with a third cubic stack of bales in the wrapping position and two previously wrapped cubic stacks of bales pushed rearwardly onto the discharge floor.
Figure 26:
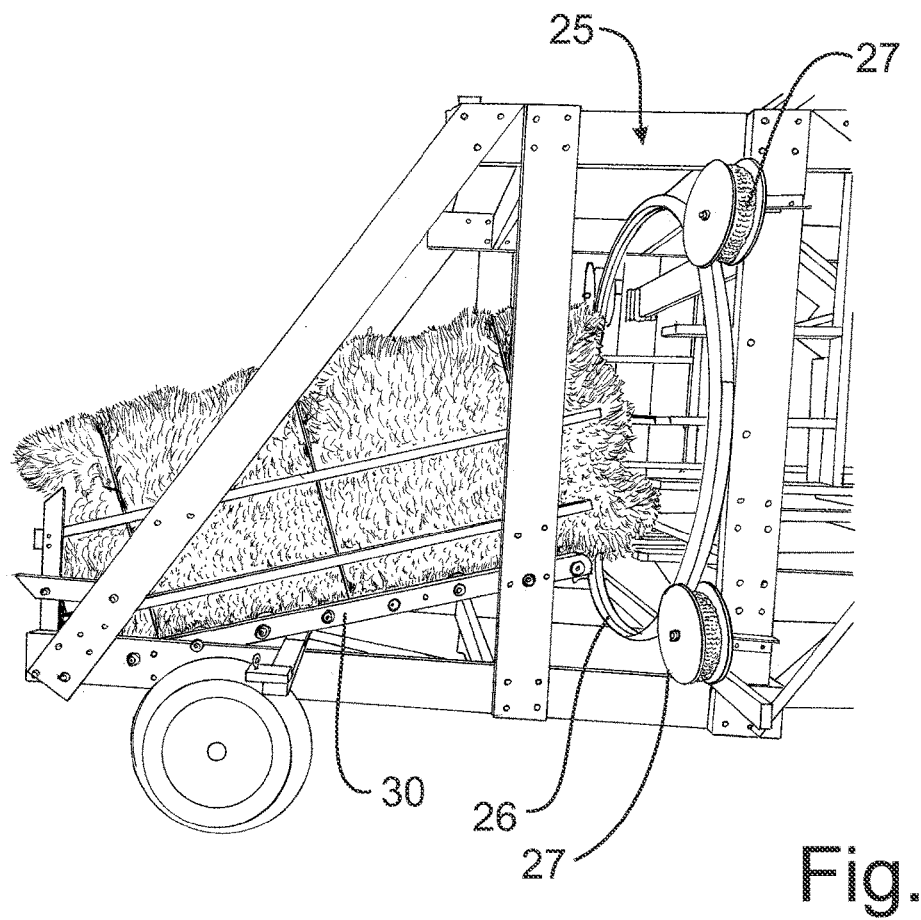
FIG. 26 is a schematic partial right side elevational view of the rearward portion of the bale bundling apparatus with three cubic stacks of bales ready for discharge.
Figure 29:
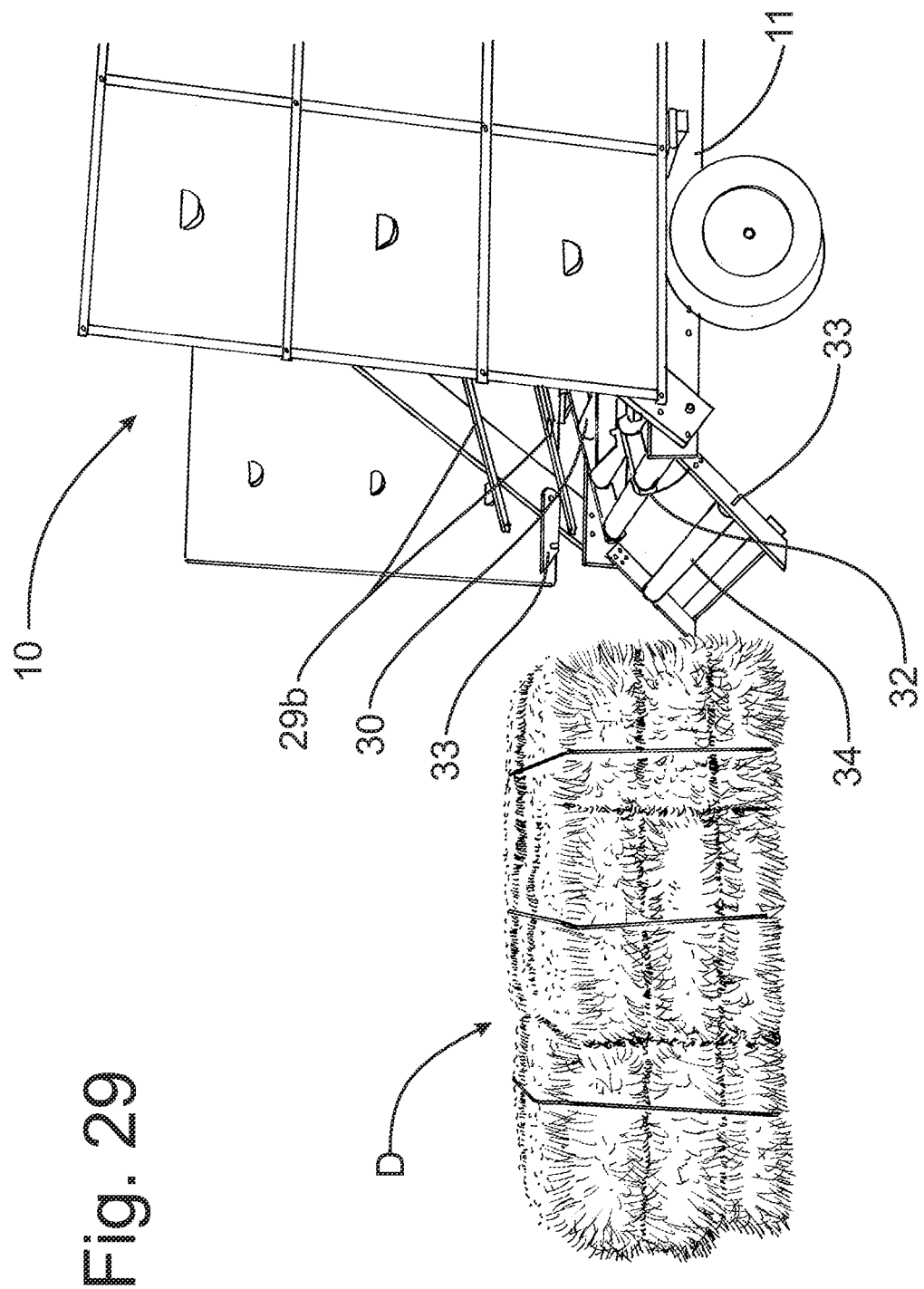
FIG. 29 is a schematic partial rear perspective view of the bale bundling apparatus with the cubic stacks of bales discharged from the bale bundling apparatus onto the ground rearwardly of the apparatus.

The building of the next cube of nine bales in the manner described above, and the subsequent movement of the second cube of bales into the wrapping mechanism 25, pushing the first cube of nine bales onto the discharge floor 30, as demonstrated in FIG. 25. The presentation of the third cube of nine bales into the wrapping mechanism 25 will create the third wrapped cube to enable the controller 35 to discharge a 27 (three cube) stack of bales onto the ground rearwardly of the bale bundler 10. The spiked chain 32 in the middle of the discharge floor 30 rotates to move the cube of bales toward and into engagement with the discharge ramp 34, as is demonstrated in FIGS. 20 and 21. The spiked chain is powered by hydraulic motor 58 and can be programed to discharge a single nine bale cube onto the ground or two cubes onto the ground for a stack of eighteen bales, alternatively, three cubes onto the ground together to form a twenty-seven bale stack.

The discharge ramp 34 is held in the vertical closed position with latches 33 on opposing sides of the discharge ramp 34. The latches are spring closed against a stop and will release under pressure from the pusher plate 29 pushing against the wrapped cubes of bales. When a completed cube on the lift table is pushed into the wrapper wrapper ring 26 by the pusher plate 29, the pusher plate 29 pushes the twenty seven bale stack rearward unlocking the discharge ramp. The discharge ramp can also be unlocked by the spiked chain on the discharge floor powering a single or double cube against the spring-loaded discharge ramp. The weight of the wrapped cubes of bales being moved down the discharge floor 30 by the spiked chain 32 will cause the discharge ramp 34 to lower against the ground as reflected in FIG. 28. Alternatively, the electronic controller 35 will signal an actuator (not shown) to lower the discharge ramp 34 to enable a placement of the wrapped cubes of hay bales D onto the ground. Once the wrapped cubes of bales D have been discharged, the spring-loaded discharge ramp will return to the upright position, as is shown in FIG. 27.

Figure 30:
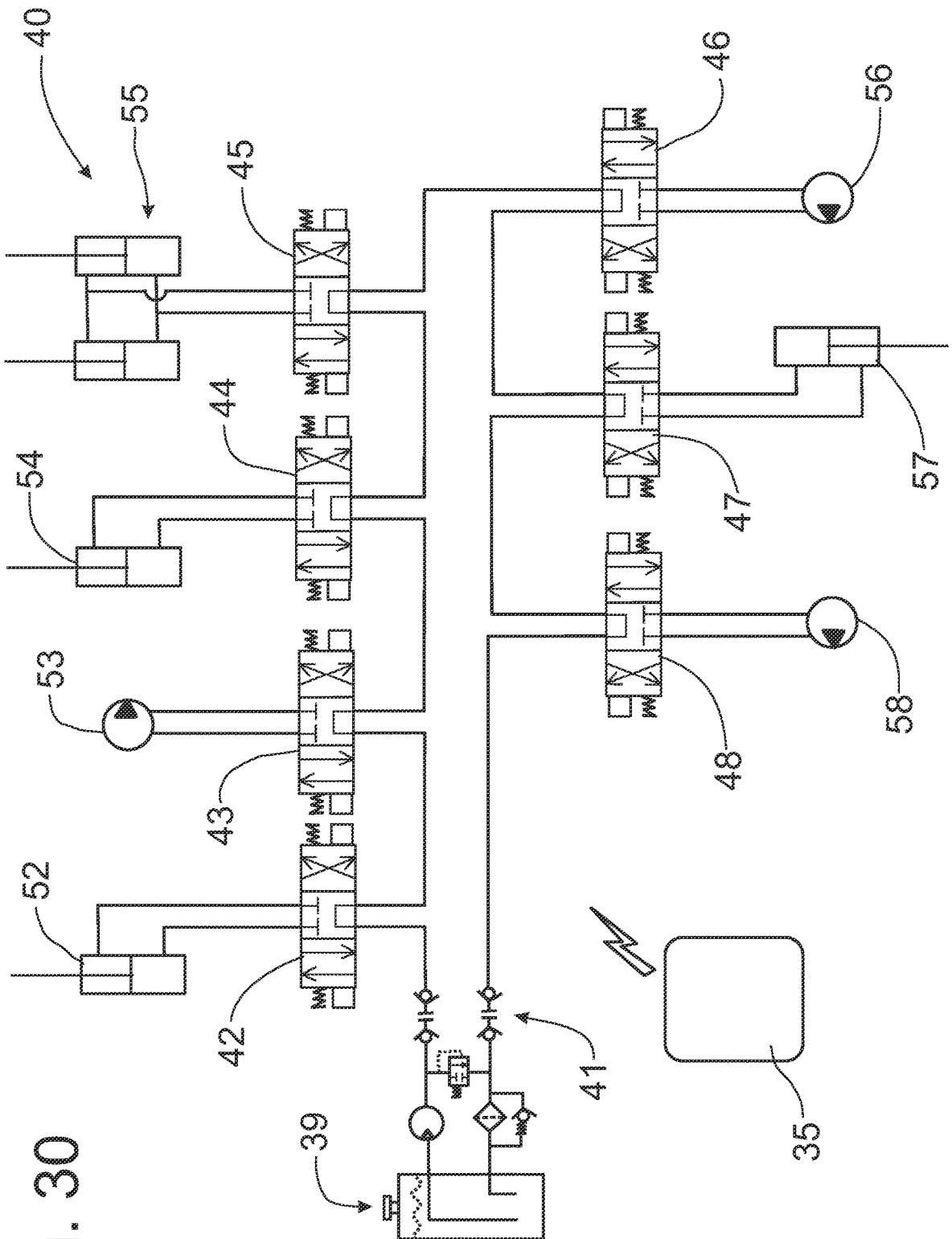
FIG. 30 is a schematic hydraulic diagram of the hydraulic system for powering the various components of the bale bundling apparatus.

A schematic of the hydraulic system 40 is shown in FIG. 30. The hydraulic system 40 for the bale bundling apparatus 10 is connected to the hydraulic system 39 of the baler (not shown) to which the bale bundling apparatus 10 is connected through quick disconnects 41. The hydraulic system 40 for the bale bundling apparatus 10 includes at least seven spool valves 42-48, which control the operations of the hydraulic components of the bale bundling apparatus 10 identified above. Each spool valve 42-48 includes a conventional three position spool, a central position in which hydraulic fluid enters the spool and is immediately moved to the return line, a forward operating position in which the hydraulic fluid is passed through the spool to the hydraulic device and returned back through the spool to the return line, and a reverse operating position in which the operation of the hydraulic device is in reverse of the operation when the spool is in the forward operating position.

The first hydraulic device in the hydraulic system 40 is a hydraulic cylinder 52 that is mounted on the elevator 15 and lateral shuttle 17 to affect movement of the shuttle blade 17a to move the centrally located bales to the left and right sides of the elevator floor 16. The electronic controller 35 activates the spool 42 to move into the forward operating position when the shuttle blade 17a is to push the centrally located bale in one direction and then into the reverse operating position to push the centrally located bale in the opposite direction. The next hydraulic device in the system 40 is the hydraulic motor 53 that is selectively operable to move the opposing elevator chains 19 and the push bars 18 connected between the opposing chains 19. The electronic controller activates the spool 43 to move from the neutral position into the forward operating position to affect rotation of the hydraulic motor 53 and a resultant movement of the elevator chains 19.

The scissors lift table 23 is raised and lowered by the hydraulic cylinder 54 connected to the scissors linkage 22 so that the movement of the hydraulic cylinder 54 is multiplied by the linkage 22. The movement of the table 23 in one direction is affected by the movement of the spool 44 into the forward operating position and in the opposite direction by movement of the spool 44 into the reverse operating position. The neutral position allows the scissors lift mechanism 20 to remain in the selected position. The extended thrust of the pusher plate 29 is accomplished by a pair of hydraulic cylinders 55 controlled by activation of the spool 45 by the electronic controller 35. The extended movement of the pusher plate 29 is accomplished by the placement of the spool 45 in the extend operating position, while the retraction of the pusher plate is accomplished by placement of the spool 45 into the retract operating position.

The hydraulic motor 56 drives the wrapping mechanism 25 by placement of the spool 46 from the neutral position into the forward operating position. The clamp mechanism 24 of the twine dispensing device 28 requires a clamping operation for which a small hydraulic cylinder 57 is provided and activated by the electronic controller 35 communicating with the spool 47. The hydraulic motor 58 drives the spiked chain 32 located in the middle of the discharge floor 30, activated by the electronic controller 35 signaling the spool 48 to move into the forward operating position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

It is to be noted that a stack of twenty-seven bales with the individual bales being made 32 inches long, results in a ninety-six inch wide stack that will fit perfectly crossways in a one hundred and two inch wide semi-truck box trailer for over the road transportation. Cubes or stacks with bales of 9, 18 or 27 can also be easily transported in the back of a pickup truck and on a 90 degree dump trailer. The process is entirely mechanically done with a tractor front-end loader and bale clamp. There is never a need to manually lift and move bales during transport or in and out of storage.

Referring now to FIGS. 31 and 32, additional concepts that can be used in the operation of the bale bundling apparatus 10 are shown. In FIG. 31, a thin disc 61 pivotally mounted on a support 62 adjacent the placement of the nine-bale cube of bales so that the disc 61 will slide between the topmost bale and the middle bale to tuck the loose twine tail between these two bales so that the loose twine tail is not hanging loose and dangling when the nine-bale cube is ejected from the bale bundling apparatus 10. The disc 61 is preferably spring loaded into engagement with the stack of bales. The twine dispensing device 28 shown in FIG. 32 is provided with a dispenser 28a that applies spaced-apart twin twines to provide a more stable bundling of the bales into a movable stack. One skilled in the art will readily recognize that other dispensers of wrapping material, such as netting and plastic, can be provided as a further option in the wrapping of the stack of bales to create a stable package of bales for subsequent handling.

Having thus described the invention, what is claimed is:

1. A bale bundling apparatus selectively connected to a prime mover, comprising:
    a wheeled frame;
    an elevator supported on said frame and having an upwardly sloped floor, said elevator being operable to form transverse rows of bales and to move the transverse rows of bales up said elevator floor, said elevator including:
        a lateral shuttle to move bales to a selected side of said elevator floor and form said transverse rows of bales; and
        a push bar operable to move said transverse rows of bales up said elevator floor;
    a vertical lift mechanism having a table and being positioned rearwardly of said elevator, said lift mechanism being operable to receive sequential rows of bales to form a vertical cube of bales,
    a wrapping mechanism located rearwardly of said vertical lift mechanism to receive said cube of bales and to wrap connecting material around said cube of bales; and
    a discharge apparatus receiving wrapped cubes of bales and discharging said wrapped cubes of bales to the ground.

2. The bale bundling apparatus of claim 1 wherein said elevator further includes:
    a pair of transversely spaced chains on said elevator floor, said chains having multiples of said push bar connected therebetween; and
    opposing guide members angled inwardly from opposing sides of said elevator floor to compress said bales in each row of bales inwardly before being placed on said vertical lift mechanism.

3. The bale bundling apparatus of claim 1 wherein said vertical lift mechanism includes a scissors linkage for affecting movement of said table in a vertical direction.

4. The bale bundling apparatus of claim 3 further comprising a pusher plate forwardly of said vertical lift mechanism to engage a formed cube of bales thereon and push said cube of bales toward and into said wrapper mechanism.

5. The bale bundling apparatus of claim 4 wherein said discharge apparatus includes a series of spaced apart rollers with a spike chain positioned centrally of said rollers to provide engagement with said wrapped cubes of bales and urge said cubes of bales to a discharge end.

6. The bale bundling apparatus of claim 5 wherein a discharge ramp is positioned at the end of said discharge apparatus, said discharge ramp being spring-loaded into an upright orientation.

7. The bale bundling apparatus of claim 6 further comprising a hydraulic system operatively connected to a prime mover to power the operations of movable components on said bale bundling apparatus.

8. The bale bundling apparatus of claim 1 wherein wrapping mechanism includes:
    a wrapper ring rotatably supported on circumferentially spaced support wheels; and
    a twine dispenser secured to said wrapper ring and rotatable therewith, said twine dispenser wrapping twine around said cube of bales passing through said wrapper ring.

9. A bale bundling apparatus selectively connected to a prime mover, comprising:
    a wheeled frame;
    an elevator supported on said frame and having a upwardly sloped floor, said elevator being operable to form transverse rows of bales and to move the transverse rows of bales up said elevator floor, said elevator including a lateral shuttle to move bales to a selected side of said elevator floor and form said transverse rows of bales, and a push bar operable to move said transverse rows of bales up said elevator floor
    a vertical lift mechanism having a table and being positioned rearwardly of said elevator to receive sequential rows of bales from said elevator and form a stack of bales; and
    a wrapping mechanism located rearwardly of said vertical lift mechanism to receive said stack of bales and to place wrapping material around said stack of bales for discharge from the bale bundling apparatus.

10. The bale bundling apparatus of claim 9 further comprising:
    a discharge apparatus receiving wrapped cubes of bales and discharging said wrapped cubes of bales to the ground.

11. The bale bundling apparatus of claim 10 wherein said elevator further includes:
    a pair of transversely spaced chains on said elevator floor, said chains having multiples of said push bar connected therebetween; and
    opposing guide members angled inwardly from opposing sides of said elevator floor to compress said bales in each row of bales inwardly before being placed on said vertical lift mechanism.

12. The bale bundling apparatus of claim 10 wherein said discharge apparatus includes a series of spaced apart rollers with a spike chain positioned centrally of said rollers to provide engagement with said wrapped cubes of bales and urge said cubes of bales to a discharge end.

13. The bale bundling apparatus of claim 12 wherein a discharge ramp is positioned at the end of said discharge apparatus, said discharge ramp being spring-loaded into an upright orientation.

14. The bale bundling apparatus of claim 9 further comprising:
    a hydraulic system is operatively connected to a prime mover to power the operations of movable components on said bale bundling apparatus.

15. The bale bundling apparatus of claim 9 wherein said vertical lift mechanism includes a scissors linkage for affecting movement of said table in a vertical direction.

16. The bale bundling apparatus of claim 9 further comprising a pusher plate forwardly of said vertical lift mechanism to engage a formed cube of bales thereon and push said cube of bales toward and into said wrapper mechanism.

17. The bale bundling apparatus of claim 9 wherein said wrapping mechanism includes:
    a wrapper ring rotatably supported on circumferentially spaced support wheels; and
    a twine dispenser secured to said wrapper ring and rotatable therewith, said twine dispenser wrapping twine around said cube of bales passing through said wrapper ring.

18. A method of bundling bales of crop material comprising the steps of:
    forming a row of three bales of crop material on an elevator by the steps of:
        receiving a first bale of crop material at a first position on an elevator floor;
        pushing the first bale of crop material to a first side position on said elevator floor with a lateral shuttle;

receiving a second bale of crop material at said first position;

pushing the second bale with said lateral shuttle to a second side position on said elevator floor;

receiving a third bale at said first position between said first and second bales;

moving said row of bales along said elevator floor by a push bar until deposited onto a vertical lift mechanism positioned at a rearward position to said elevator floor;

repeating said forming step to form second and third rows of bales deposited onto said vertical lift mechanism;

activating a pusher plate to move said three rows of bales rearwardly from said vertical lift mechanism unto a wrapping apparatus;

repeating said forming step, said moving step and said activating step to create a stack of bales on said wrapping apparatus;

wrapping said stack of bales with wrapping material to maintain shape of said stack of bales; and discharging said stack of bales with said wrapping material from a discharge device.

19. The method of claim 18 wherein said forming step, said moving step, said activating step and said wrapping step are accomplished with hydraulicly powered devices operatively connected to a hydraulic system.

20. The method of claim 18 wherein said wrapping material is plastic film.

* * * * *